United States Patent [19]

Mullins et al.

[11] 3,903,525
[45] Sept. 2, 1975

[54] DOPPLER RADAR SYSTEM WITH OPTIMIZED SIGNAL PROCESSING

[75] Inventors: William H. Mullins, Manhattan Beach; Robert N. Parker, Los Angeles, both of Calif.

[73] Assignee: Hughes Aircraft Company, Culver City, Calif.

[22] Filed: June 21, 1965

[21] Appl. No.: 465,795

[52] U.S. Cl. ................................................. 343/7.7
[51] Int. Cl.$^2$ .......................................... G01S 9/42
[58] Field of Search ...... 343/7.7, 8, 9, 17.1, 17.1 R, 343/17.1 PF

[56] References Cited
UNITED STATES PATENTS
3,228,028   1/1966   Baum.............................. 343/7.7 X
3,267,468   8/1966   Stull.................................... 343/7.7

Primary Examiner—Maynard R. Wilbur
Assistant Examiner—G. E. Montone
Attorney, Agent, or Firm—W. H. MacAllister; Walter J. Adam

[57] ABSTRACT

A moving target indicating doppler radar that includes a coherent on receive system and a clutter referenced velocity compensator operating in association with a linear predictor to produce coherent IF (intermediate frequency) receive signals shifted in frequency to compensate for the radar platform and antenna scanning motion. A synchronous detector, with pulse repetition frequency modulation, translates the coherent IF received signals to video signals at a desired frequency offset. A storage processor processes and range gates the video signals prior to clutter rejection. The resultant target signals are correlated in a control circuit, processed by doppler filters and then displayed as a representation of moving targets.

20 Claims, 28 Drawing Figures

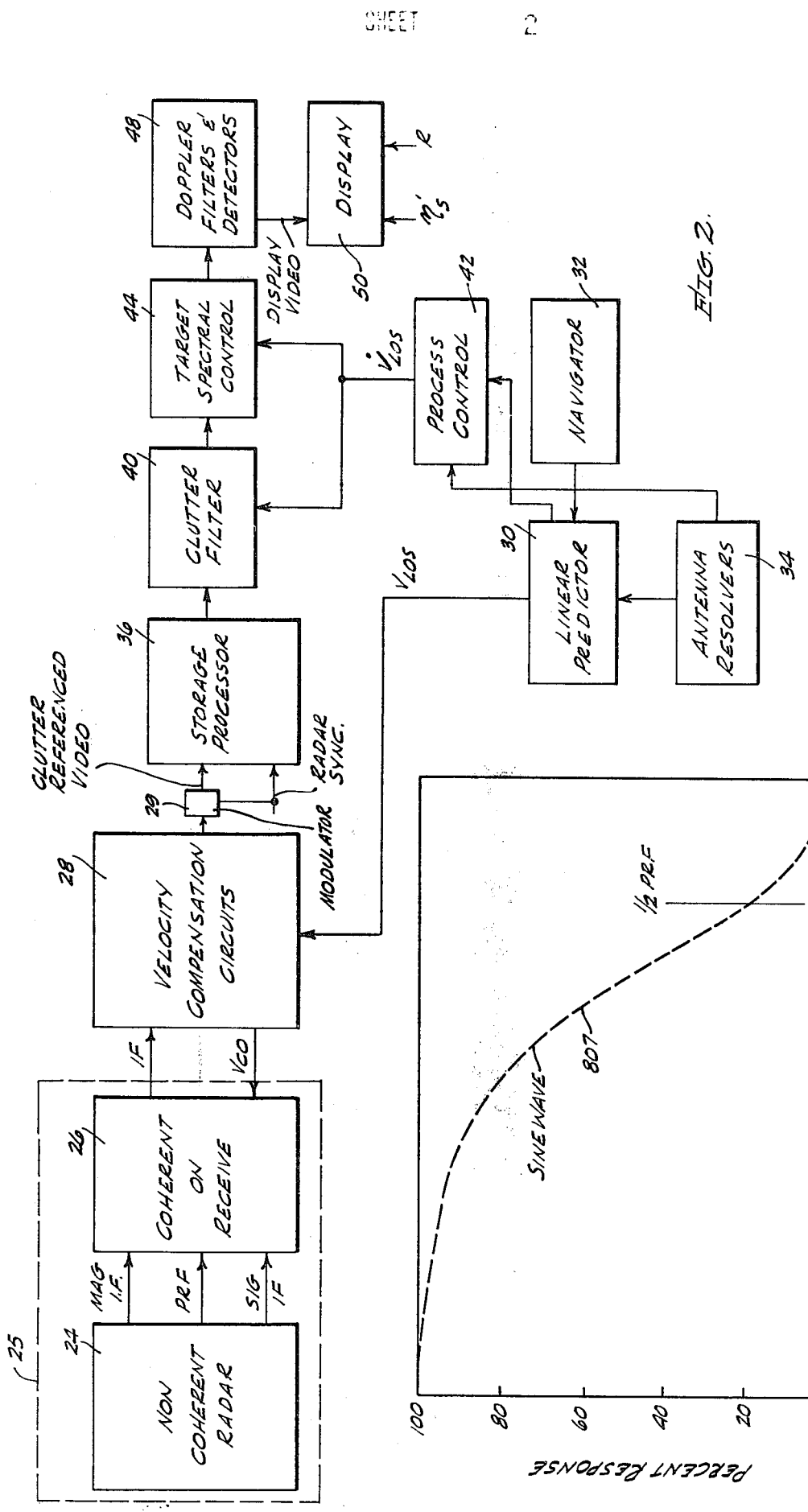

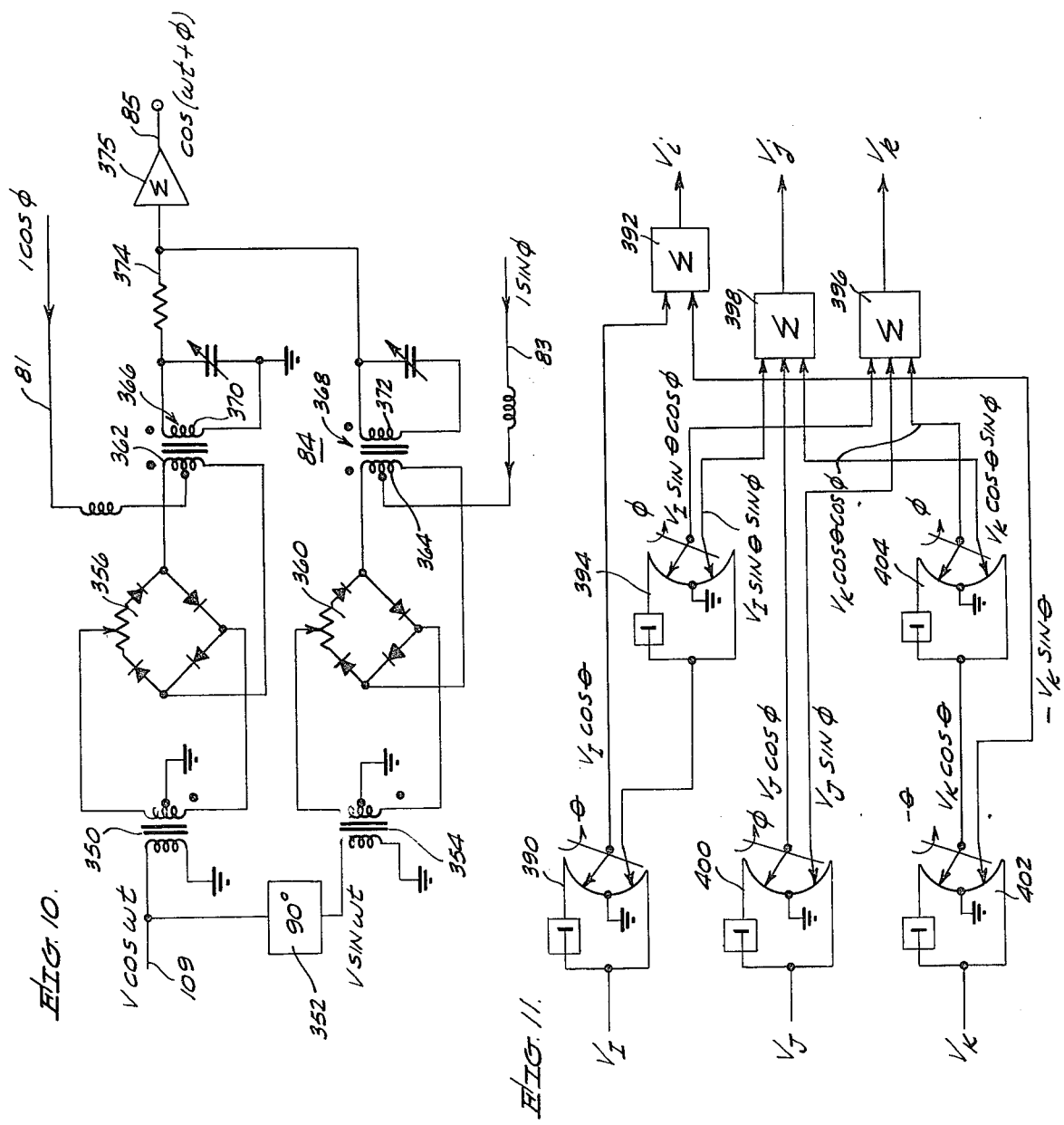

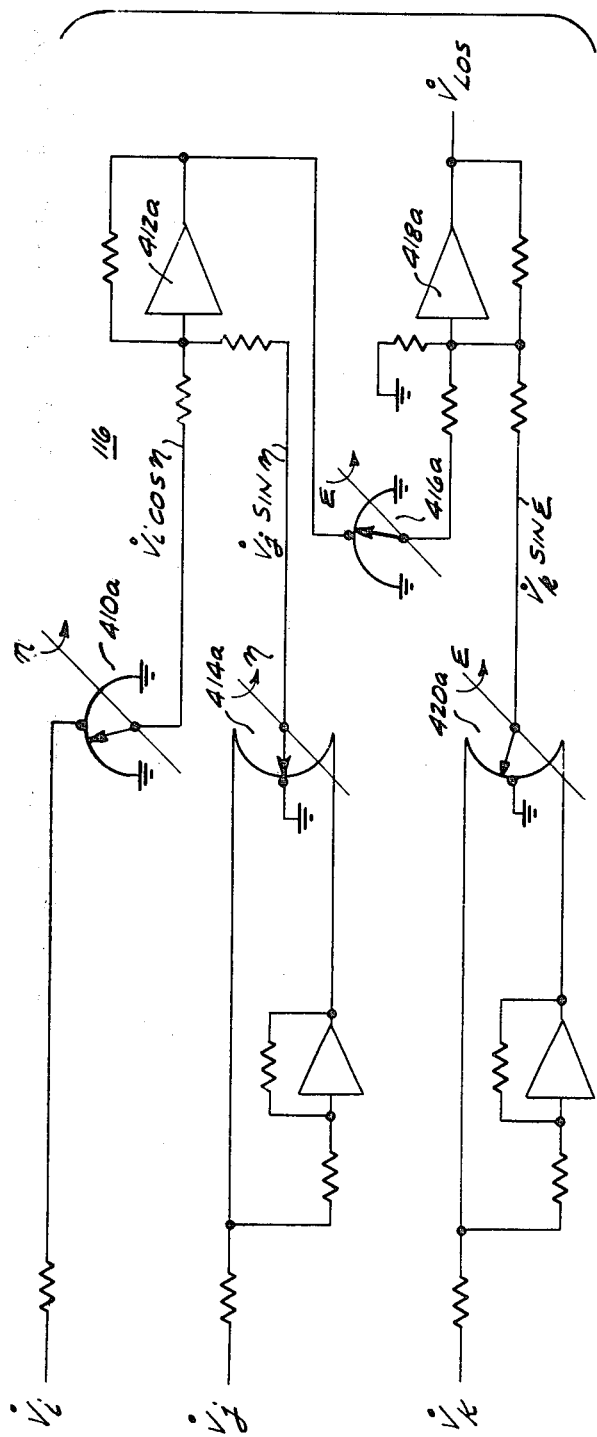
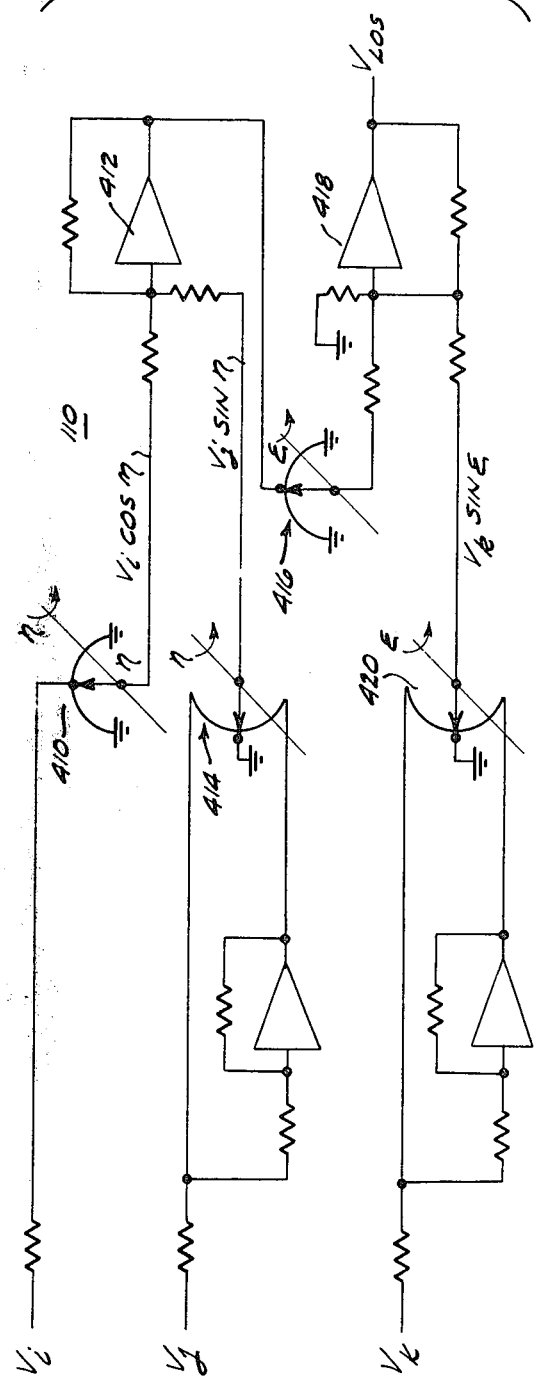

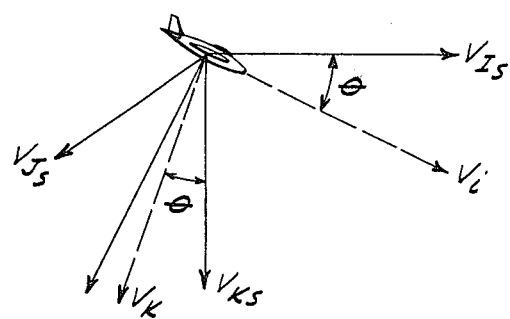
FIG. 15.
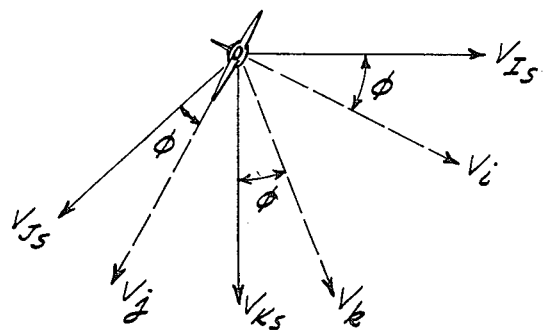
FIG. 16.
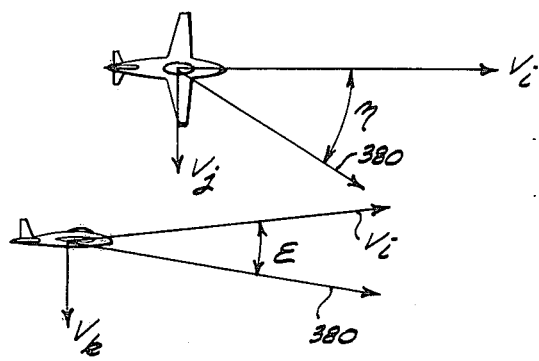
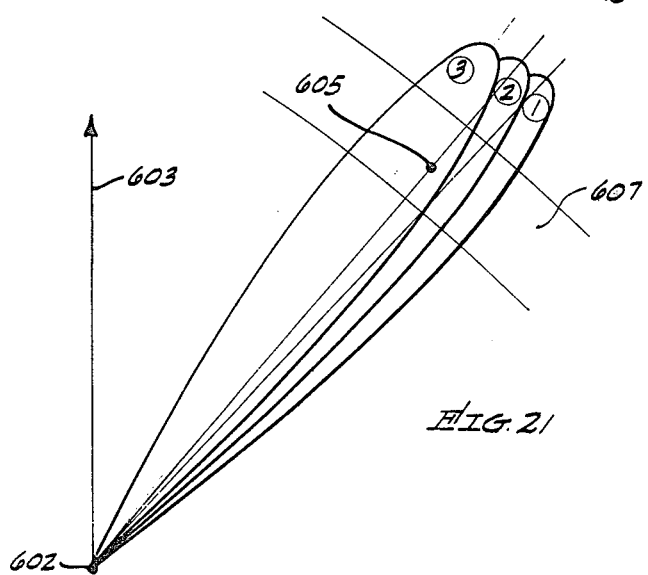
FIG. 21

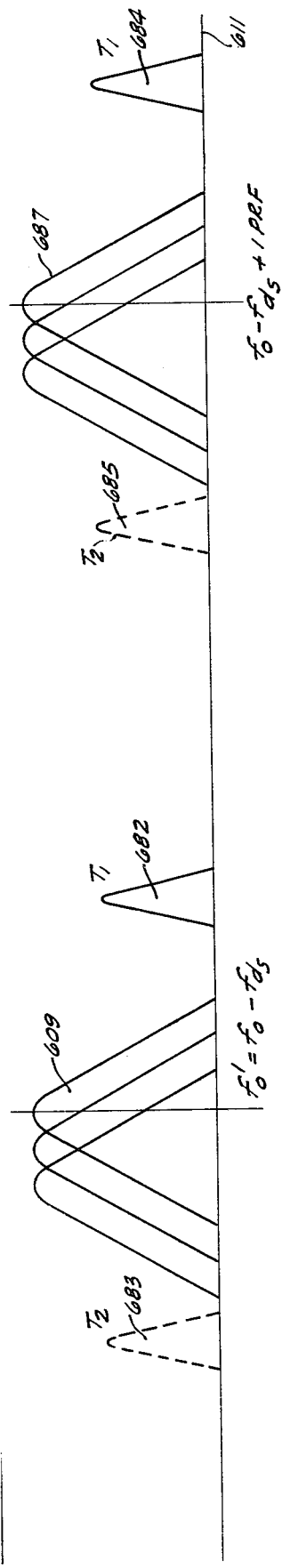
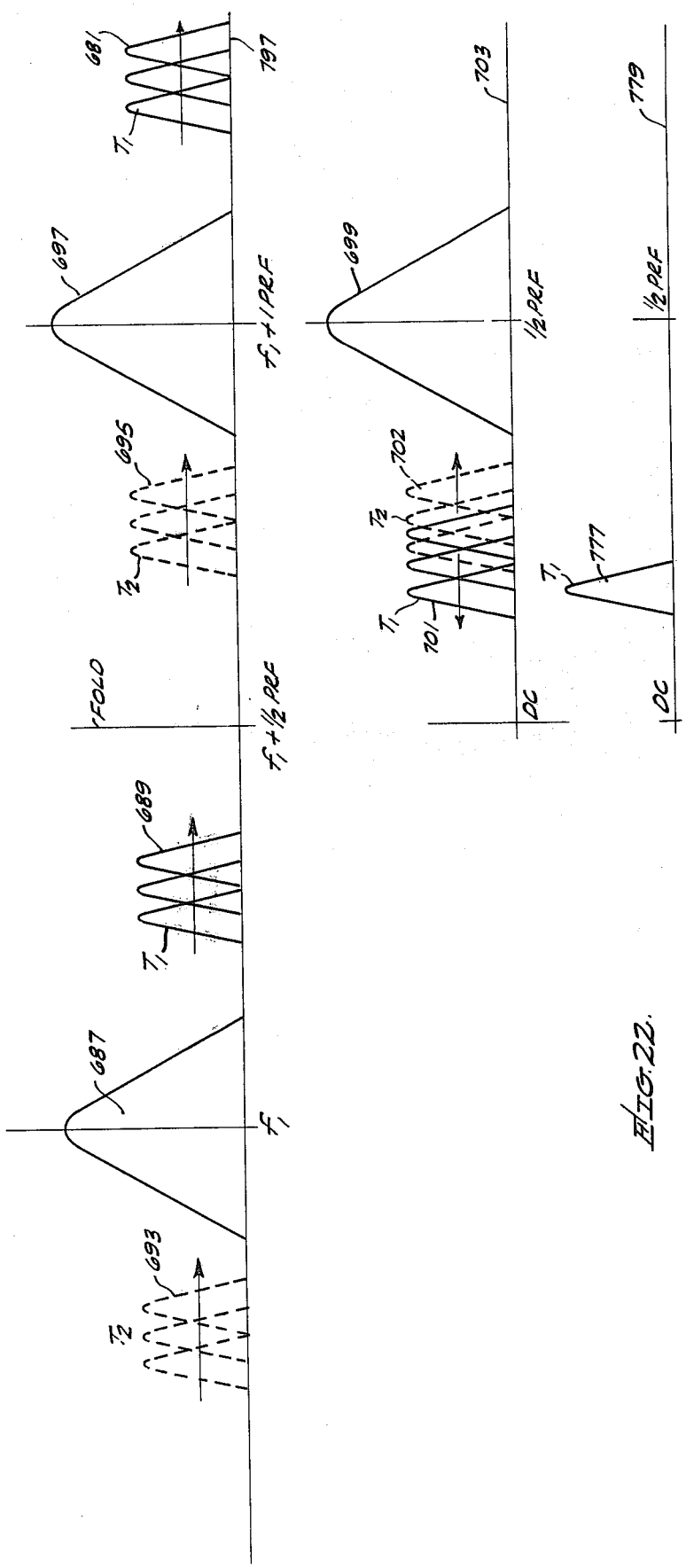
FIG. 22.

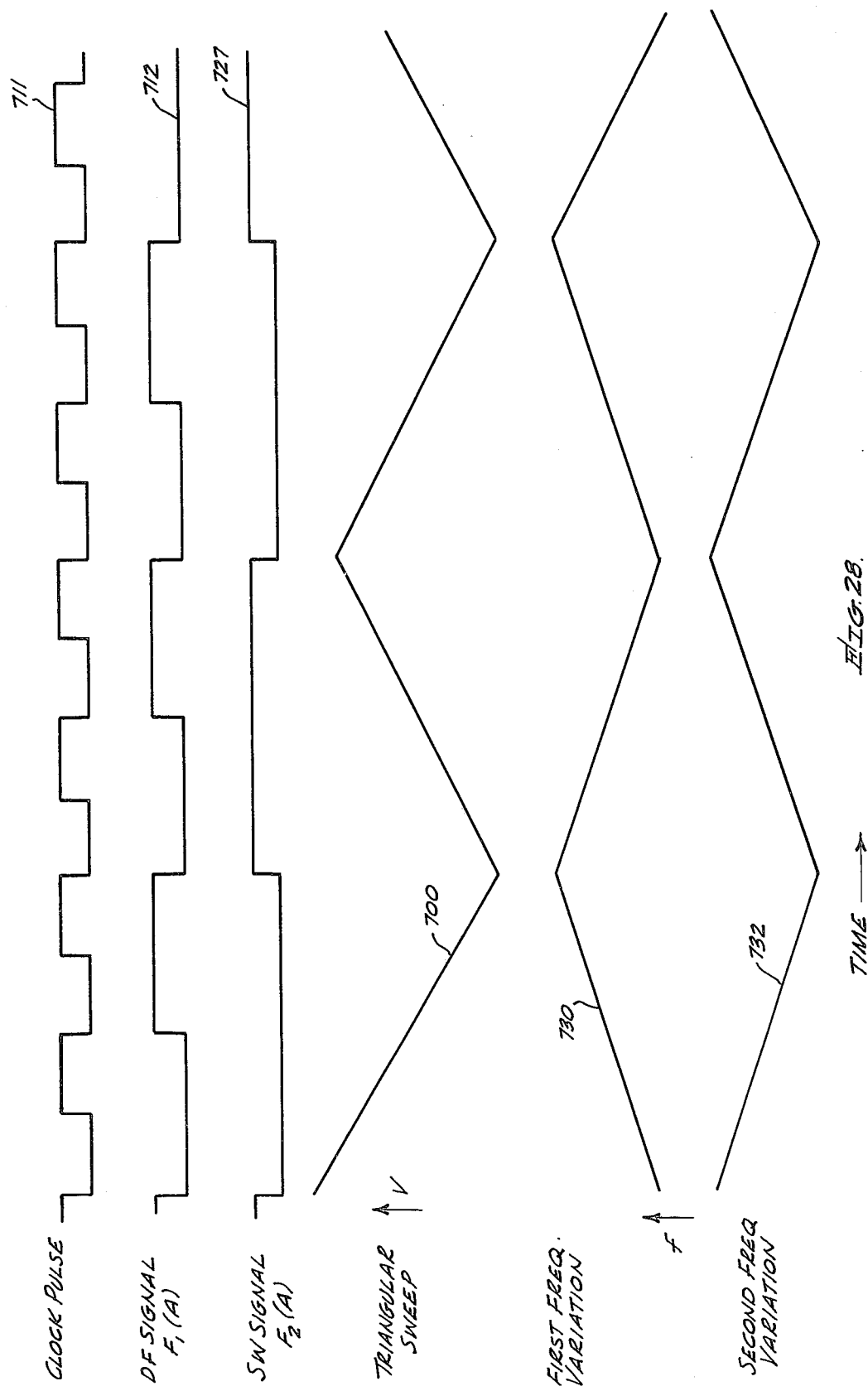

3,903,525

DOPPLER RADAR SYSTEM WITH OPTIMIZED SIGNAL PROCESSING

This invention relates to radar systems and particularly to a coherent doppler radar system, operable with either a coherent or noncoherent transmitter and receiver, for detecting moving targets in the presence or absence of clutter conditions and for providing improved and reliable signal processing of the radar signals.

For detection of moving targets such as from an aircraft moving over terrain of varying configurations, delay line techniques have been conventionally utilized in either coherent or noncoherent type radar systems. As these moving target indicators operate with sweep-to-sweep radar signal comparisons, extremely close control of the radar pulse repetition rate is required. Also, these systems are limited in their performance at low pulse repetition rates and high platform speeds because of the selectivity characteristics of the comb filters which discriminate against clutter signals. Nocoherent systems utilizing delay line techniques operating with sweep-to-sweep signal comparisons also require clutter to be at the same range and relative bearing as the target for satisfactory operation. Noncoherent moving target techniques are utilized because of their relative freedom from platform motion effects but their dependence upon target-to-clutter ratios restricts their performance. Conventional clutter referenced coherent systems have been found to be undesirable because of momentary discontinuities of clutter energy and a tendency to unlock on moving targets, especially when operating over rough terrain.

Radar systems which operate at a high pulse repetition rate are ambiguous in range determination and are highly sensitive to side-lobe clutter signals when airborne at intermediate and low altitudes. Thus, high pulse repetition radar systems are limited in their performance against targets with beam to tail aspects with respect to radar line-of-sight and against targets moving at low velocities over terrain which provides strong main lobe clutter signals. Most pulse doppler radars operate at a high pulse repetition frequency to avoid the doppler blind speeds which occur when the separation of the repeating spectral lines are less than the relative doppler shift between the clutter and the target.

A pulse doppler radar using a low pulse repetition frequency (as with conventional noncoherent radar systems) provides unambiguous range information but the velocity information is ambiguous and part of the spectral region is obscured as well. This type of system may utilize range gating to provide a desirable signal-to-clutter ratio and to prevent clutter signals from all ranges from collapsing into the filters. Blind periods, during which the target passes into the clutter spectral region, can be eliminated by sensing the occurrence of velocity eclipsing and varying the pulse repetition frequency or by suitably programming two or more PRF's (pulse repetition frequencies). A system that is coherent, operate at a low pulse repetition frequency to minimize side lobe and main lobe clutter effects and to maximize performance with respect to the target aspect and speed, utilizes velocity compensation to minimize the sensitivity to clutter signal frequency fluctuations and amplitude fluctuations and processes signals matched in frequency characteristics to the transmitted signal, would be highly desirable in the radar field.

Conventional coherent radar systems typically utilize a relatively complex slaved coherent arrangement with phase locked oscillators. A system that operates with conventional magnetron equipped transmitter and receiver to provide coherent doppler detection of moving targets would also be desirable for extending detection and tracking capabilities to low altitude targets characteristically obscured by ground clutter signals.

It is therefore an object of this invention to provide a radar system that operates to reliably detect targets moving over regions of changing clutter signal intensity.

It is a further object of this invention to provide an improved coherent radar system operable with a noncoherent source of transmission energy such as a magnetron.

It is a still further object of this invention to provide an improved coherent radar processing system operable with a conventional noncoherent radar transmitter and receiver.

It is another object of this invention to provide a radar system operable to process the signals matched in frequency characteristics to the signal reflected from the target.

It is still another object of this invention to provide a radar process control system that has matched or nearly matched filter doppler radar capabilities for airborne applications and may be operated at low pulse repetition rates.

It is another object of this invention to provide a doppler radar system in which doppler processing is performed with a minimum of equipment.

It is another object of this invention to provide a signal processing system in which the target signals are modulated to a relatively low frequency spectral position.

It is another object of this invention to provide a radar processing system in which range gating is performed in a storage device.

It is another object of this invention to provide a radar system that provides dynamic control of signal processor bandwidth to optimize off-angle antenna performance.

Briefly the radar system in accordance with the principles of the invention may be operated in a pulsed mode and the received signals may be time sampled to confine competing signals to a narrow simultaneous interval corresponding to the target range. In one arrangement in accordance with the invention, a magnetron equipped radar may be utilized with a stable local oscillator to convert transmitted magnetron and received pulses to coherent IF (intermediate frequency) signals, except for doppler shifts. A matched open loop correction is developed at the receiver for correction of the random magnetron starting phases.

The systematic phase variations due to motion of the radar platform with respect to stationary reflectors are processed at IF frequencies to derive correction signals. The radar motion effects are corrected to first order by means of a linear predictor responding to the aircraft velocity vectors and antenna look angles, and second order corrections are provided with clutter frequency tracking loops. Thus, the system provides immunity to momentary clutter discontinuities and abrupt clutter changes because the clutter tracking corrections are second order.

The IF signals are processed with a modulating system to derive clutter referenced coherent video signals with the clutter signals shifted to a selected frequency as a function of the pulse repetition frequency and with the target signals in the low frequency region.

To provide a system matched in time and frequency to the transmitted pulses, the video data is processed in a scan conversion device such as an electrical storage tube or a magnetic element in which the data is recorded during each range element and subsequently read-out in a cross-scan fashion to examine a number of individual range elements at each range interval. Common doppler processing circuitry operating at the frequency range of the signal read from the scan conversion device may be utilized for the range sample data.

A processor with variable bandwidth may be utilized in which the bandwidth of a clutter rejection filter is adjusted to correspond to the clutter width as a function of the antenna angle and the velocity of the aircraft. The compensation of platform velocity imparts a frequency modulation on the signal during the scanning which is a function of the antenna look angle. A swept frequency oscillator correlates the target signals after the clutter is removed in the filter so that a desired narrow spectrum of target signals is restored for improved processing. For detecting the presence of a moving target, the target signals are then applied to a bank of common doppler filters time multiplied to respond to the data read from each range position of the storage device. Thus the system in accordance with the invention provides line-of-sight velocity prediction to maintain reliable motion compensation even in the absence of clutter and provides matched filter doppler radar capabilities.

The novel features of the invention, as well as the invention itself, both as to its organization and method of operation, will best be understood from the accompanying description, taken in connection with the accompanying drawings, in which like reference characters refer to like parts, and in which:

FIG. 2 is a schematic block diagram of the improved doppler moving target detection system in accordance with the principles of the invention;

Figure 23:
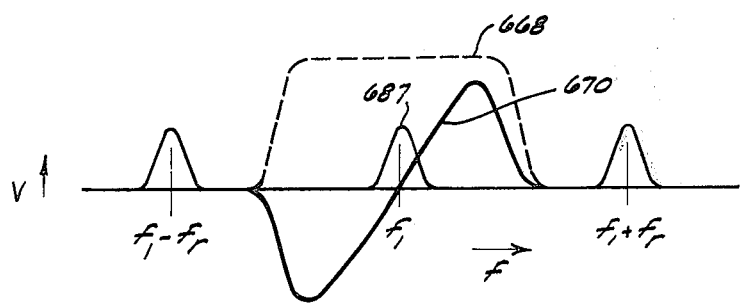
Figure 3:
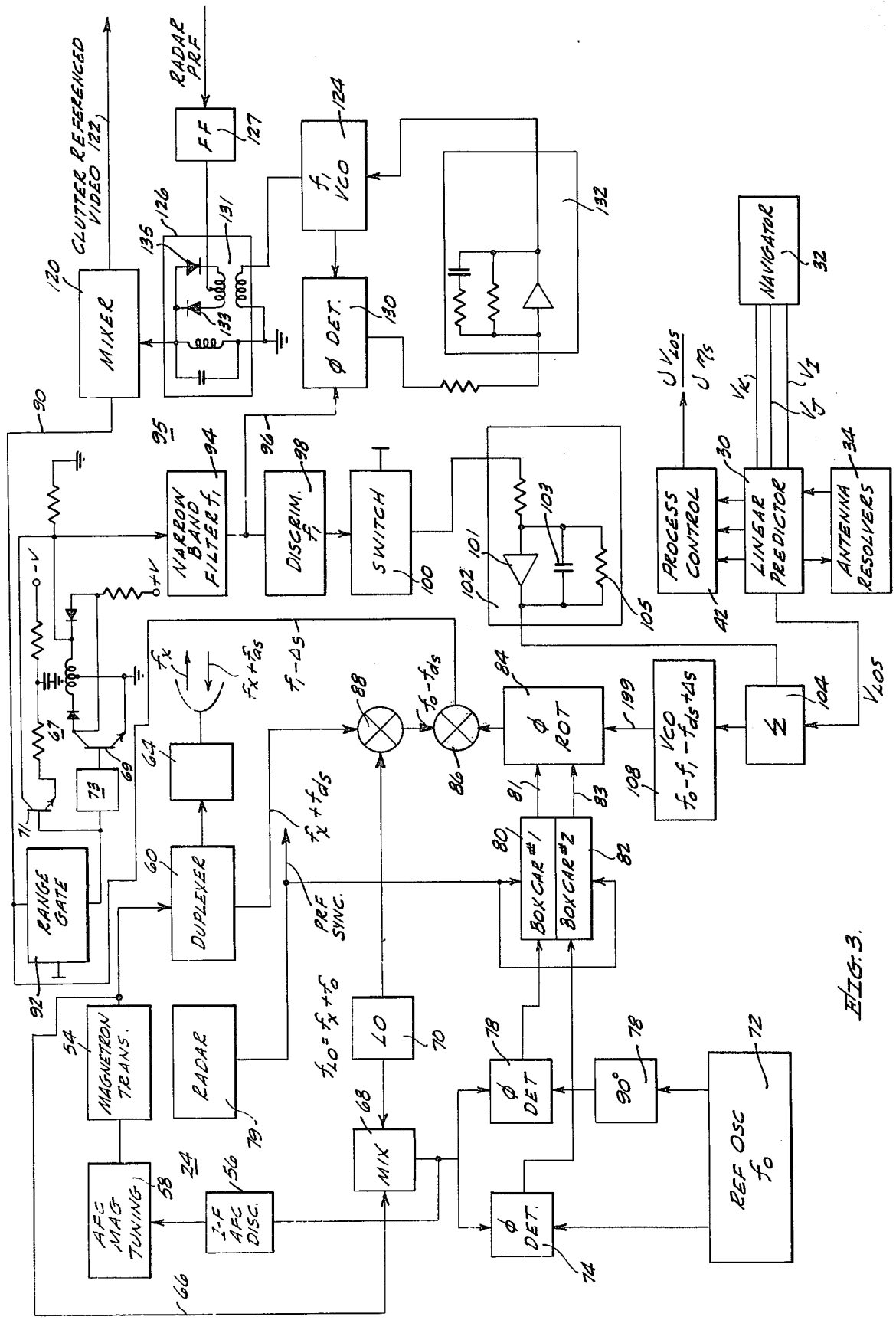
FIG. 3 is a schematic block diagram showing a first portion of the radar system of FIG. 2.
Figure 6:
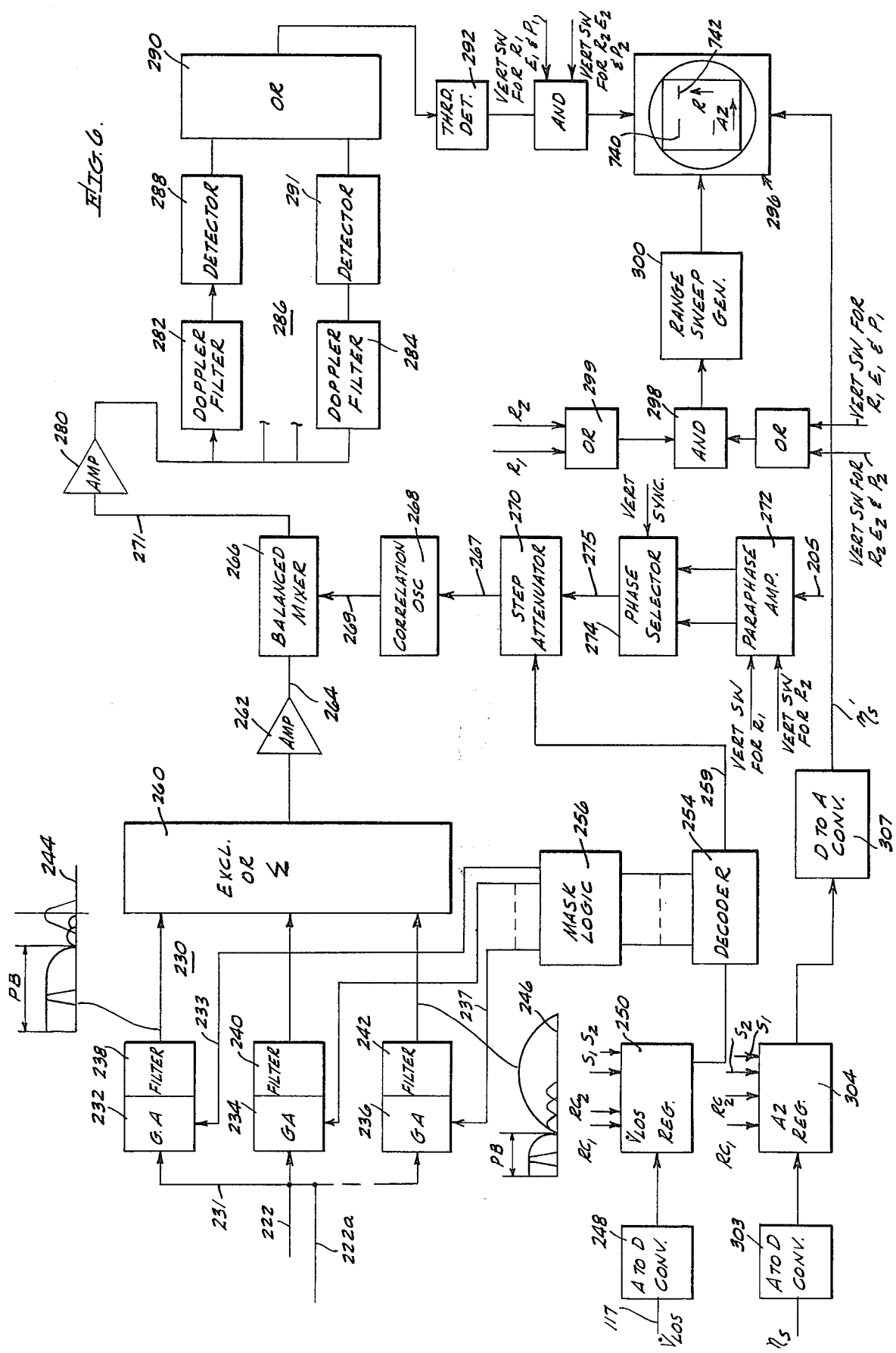
Figure 7:
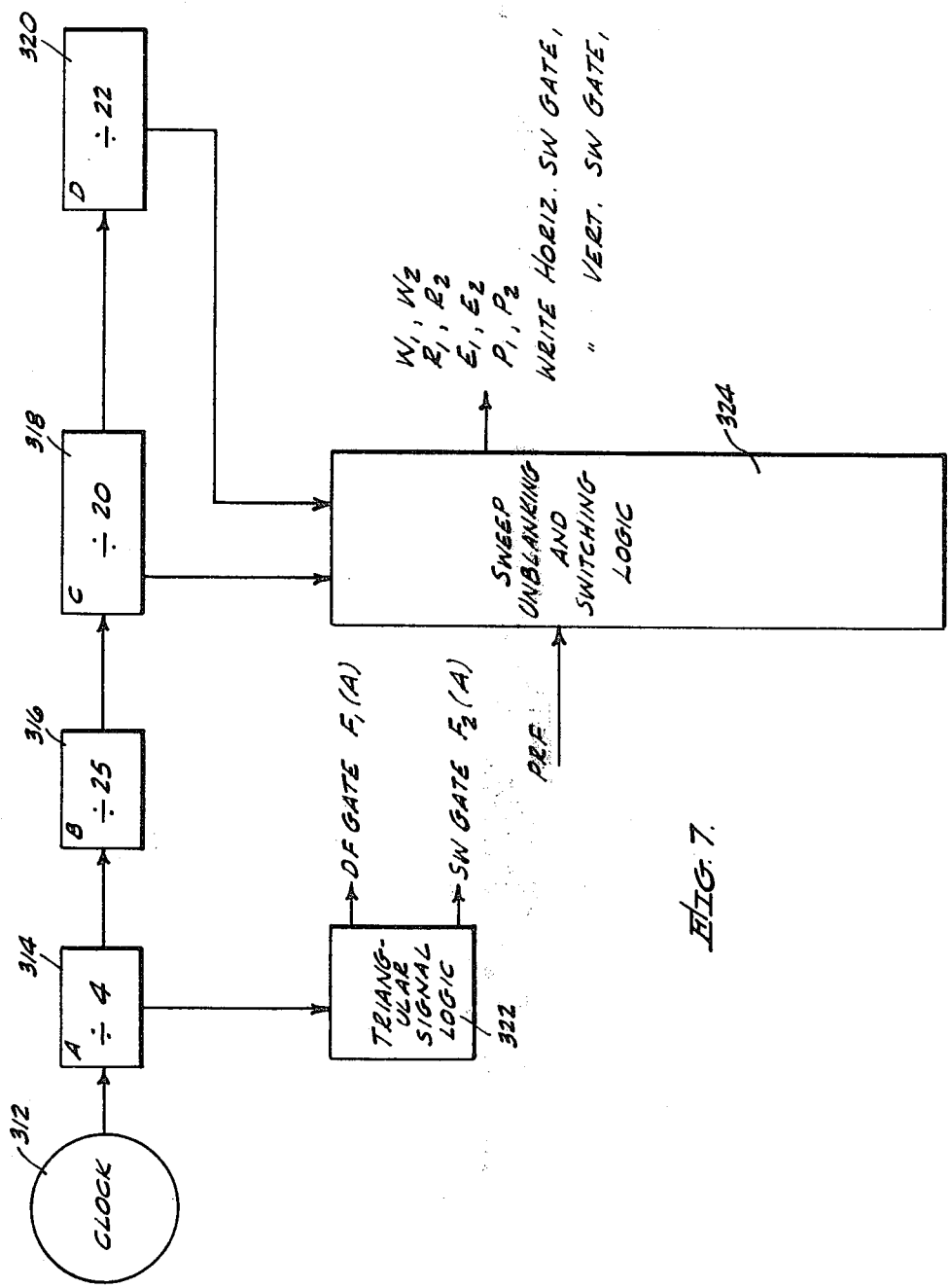
Figure 8:
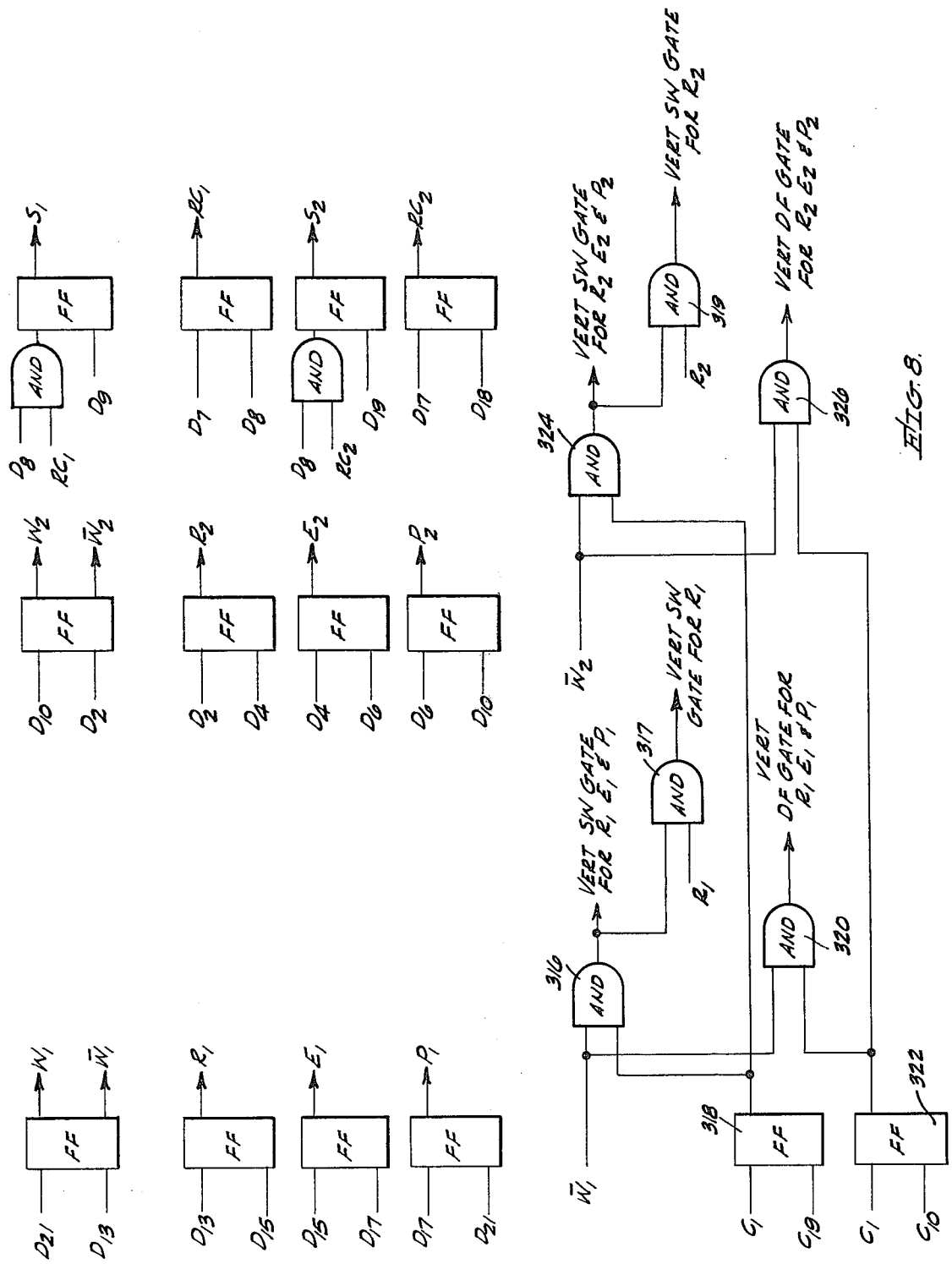
Figure 17:
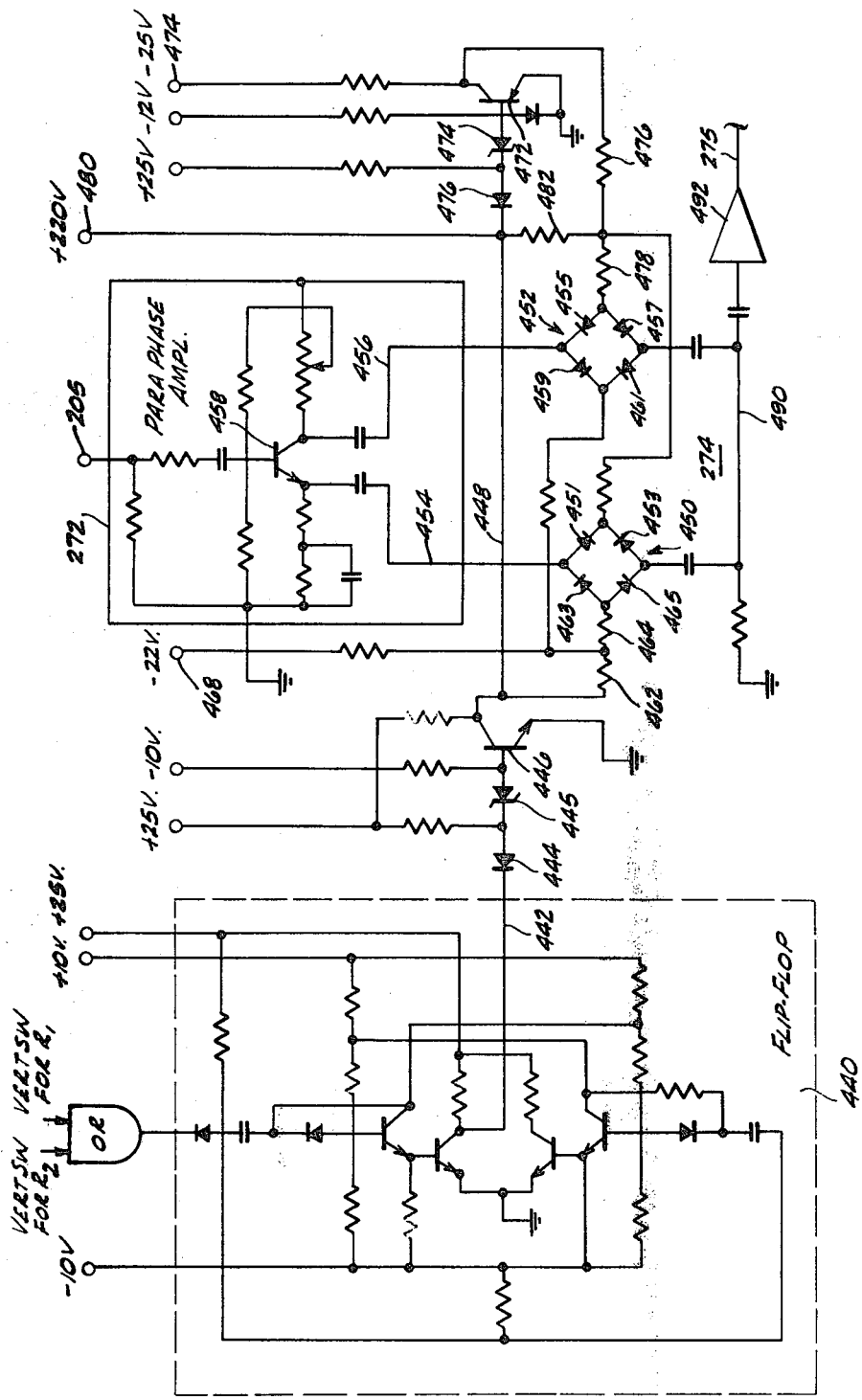
Figure 18:
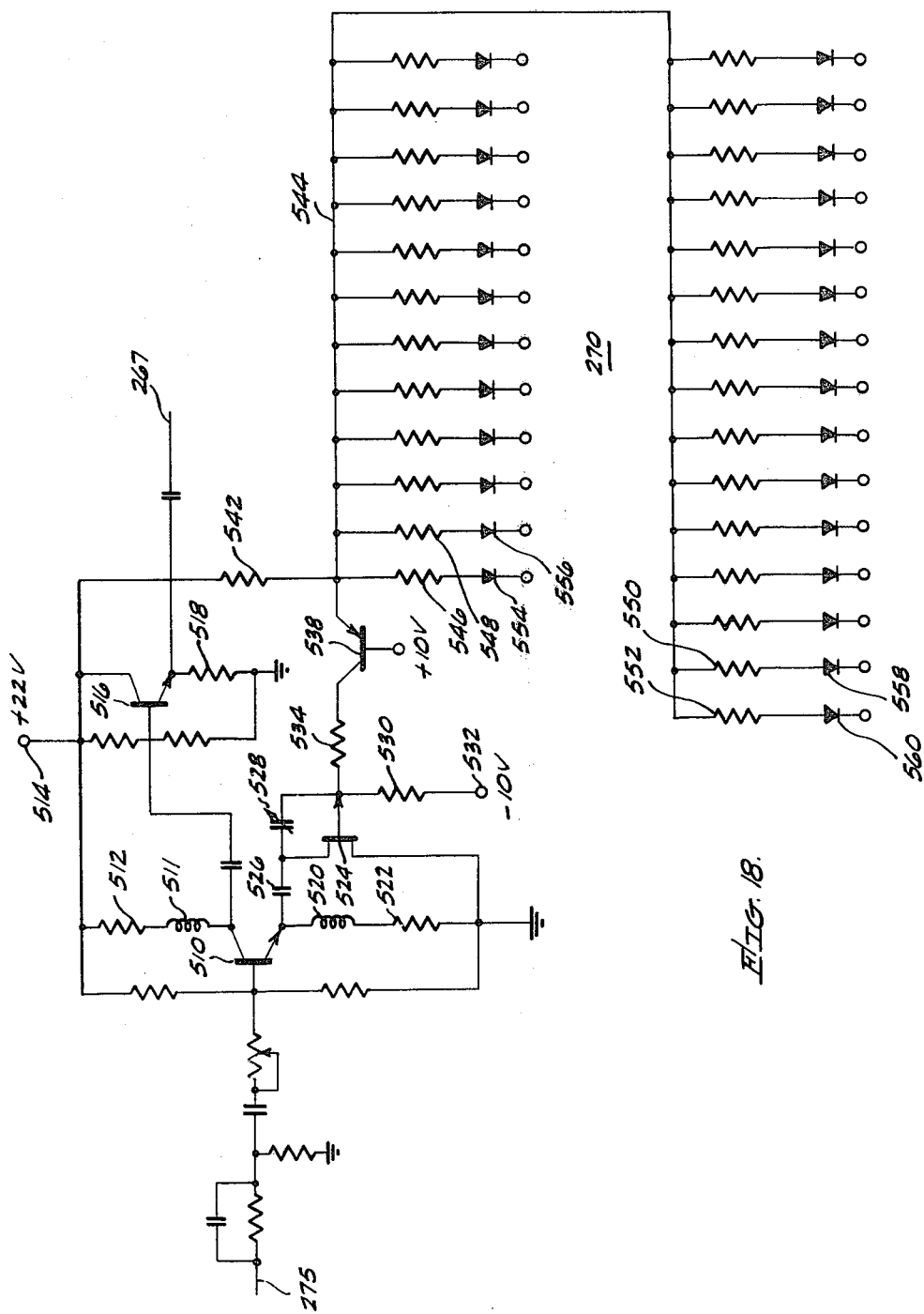
Figure 25:
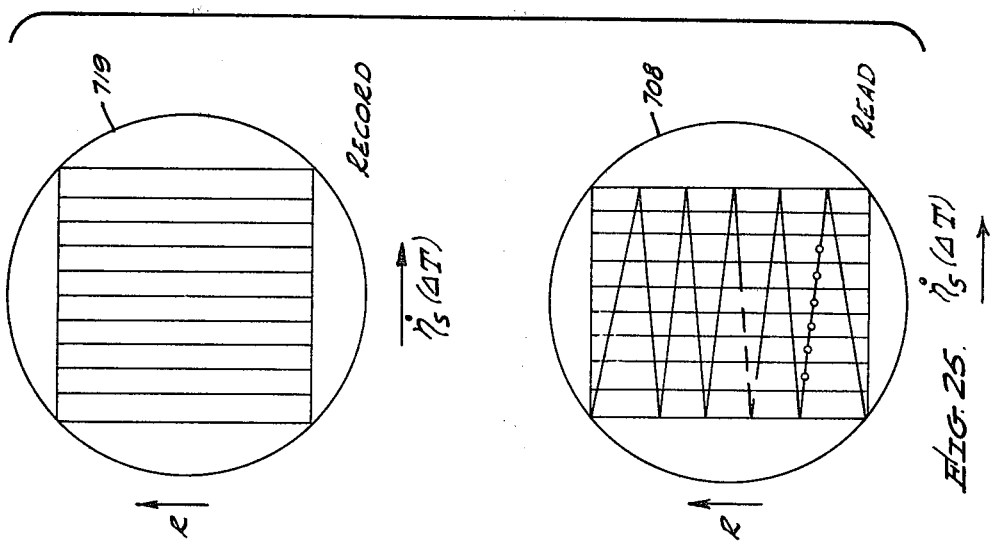
Figure 19:
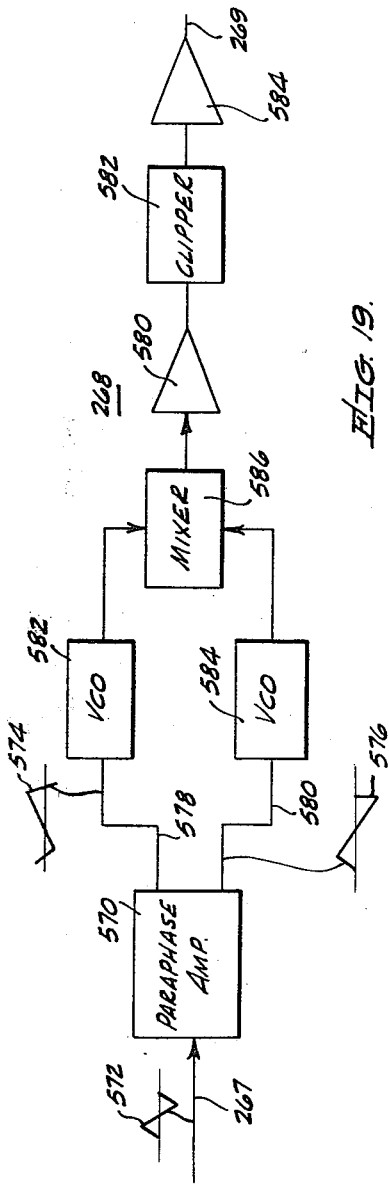
Figure 20:
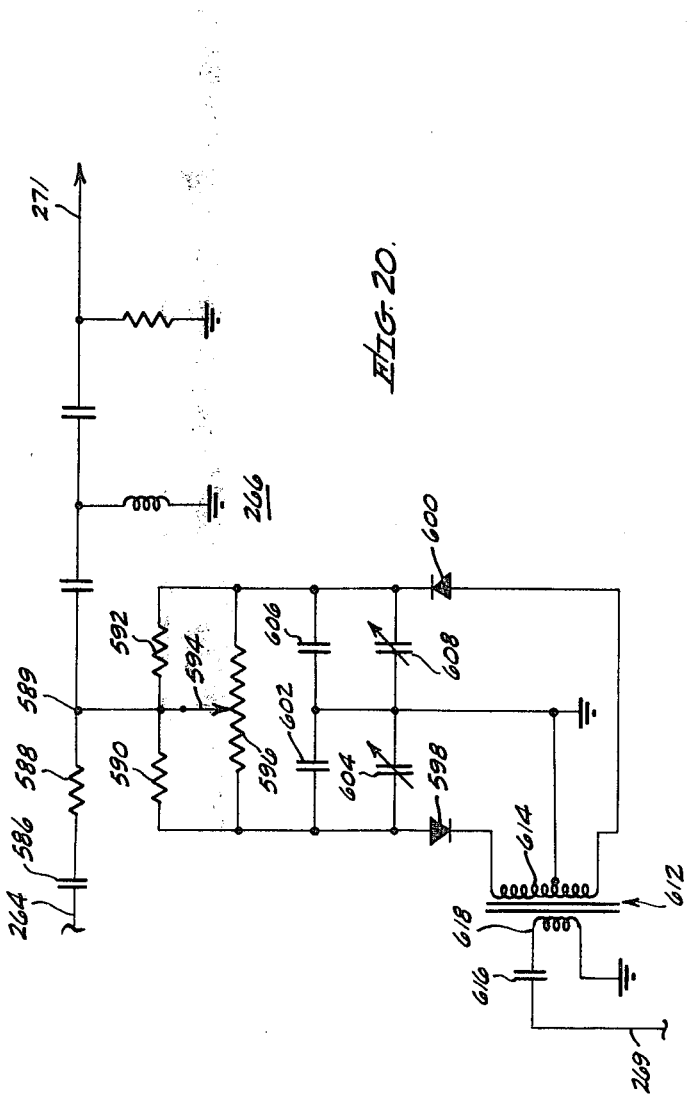
Figure 26:
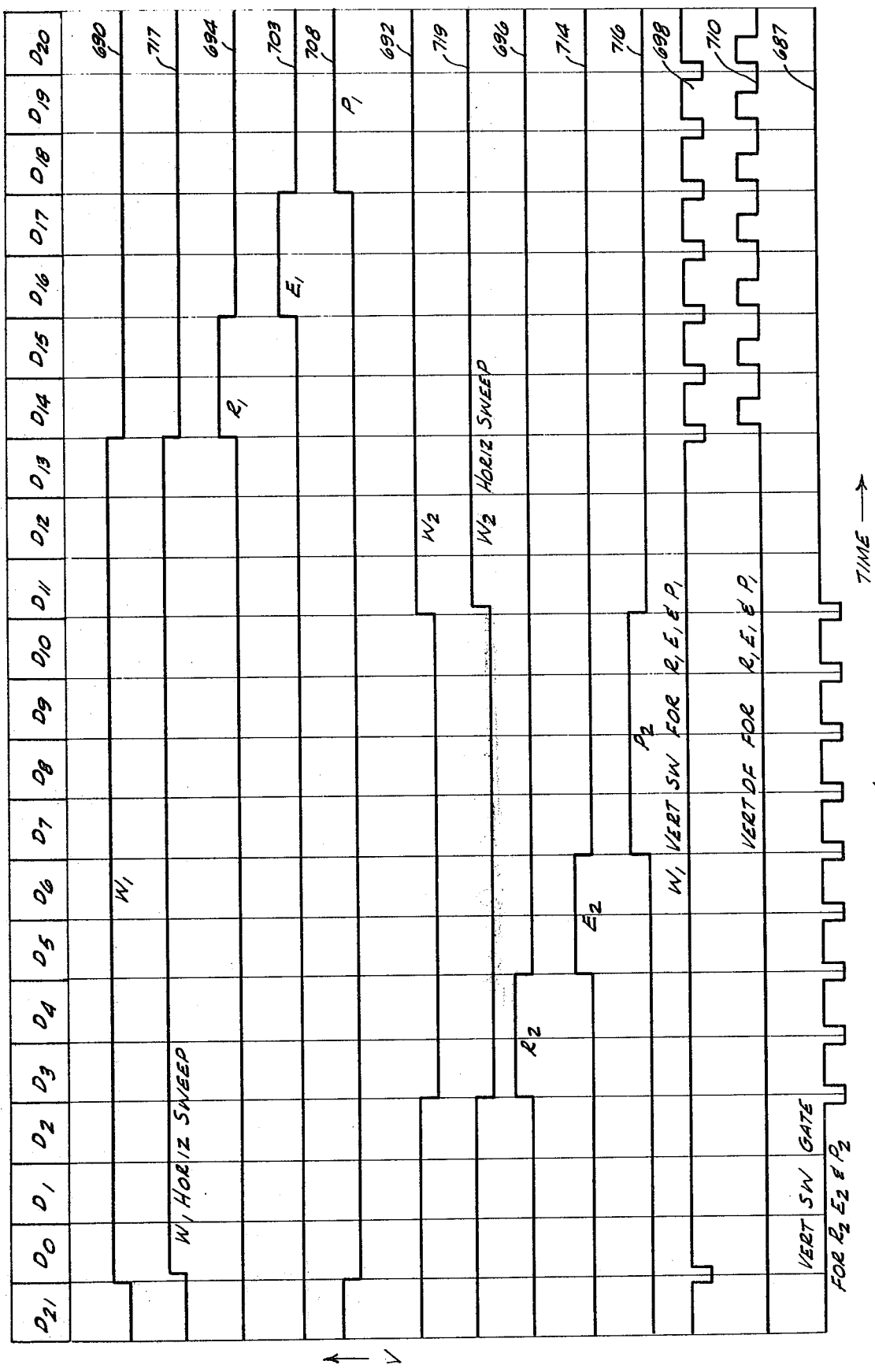
Figure 27:
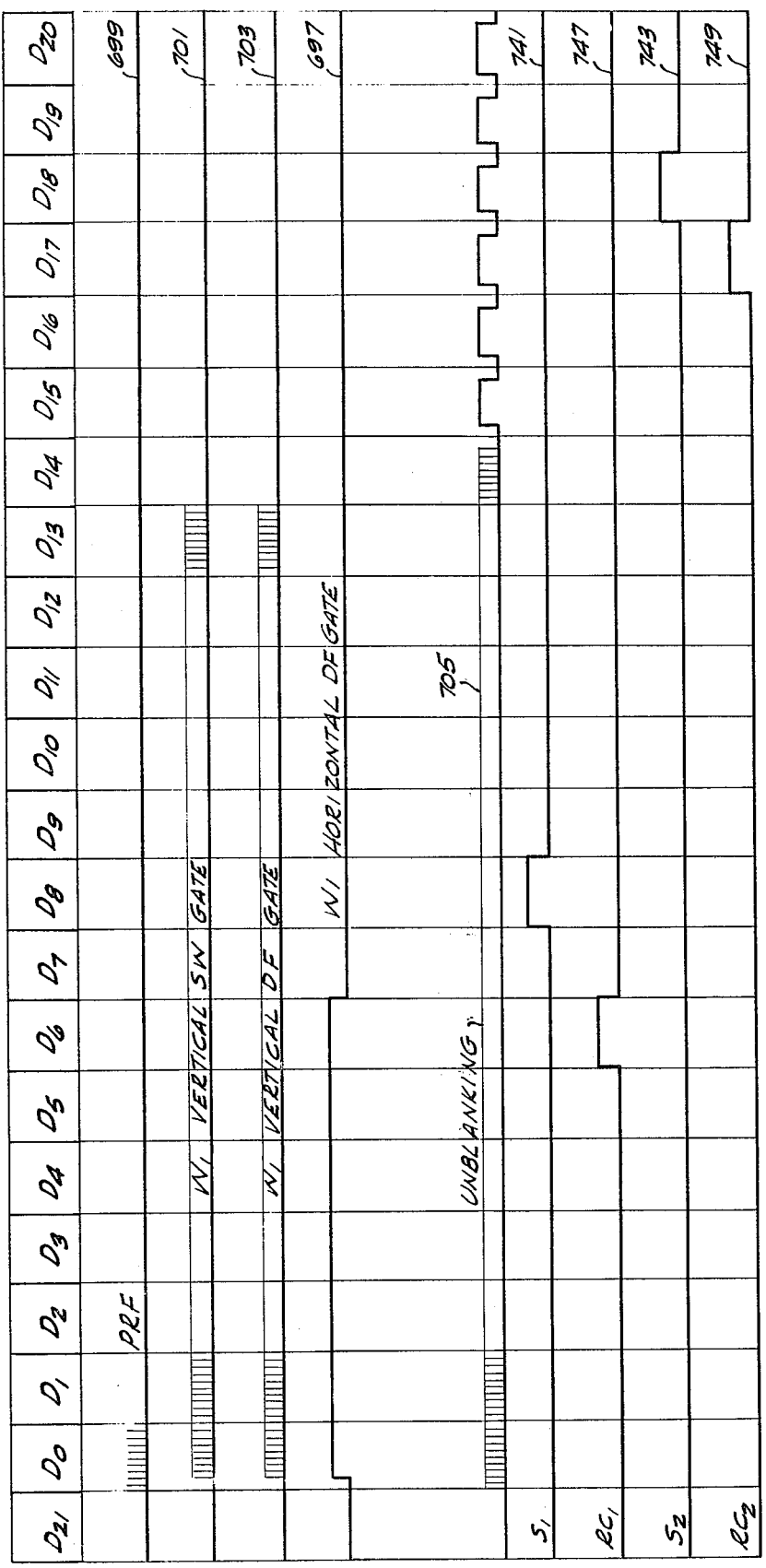

FIG. is a schematic diagram of the other storage tube that may be utilized in the storage processor of FIG. 2;

FIG. 6 is a schematic block diagram of another portion of the doppler processing system of FIG. 2;

FIG. 7 is a schematic block diagram of the processor timing control system that may be utilized in the system of FIG. 2;

FIG. 8 is a schematic diagram further illustrating the timing control system of FIG. 7;

Figures 9, 12:
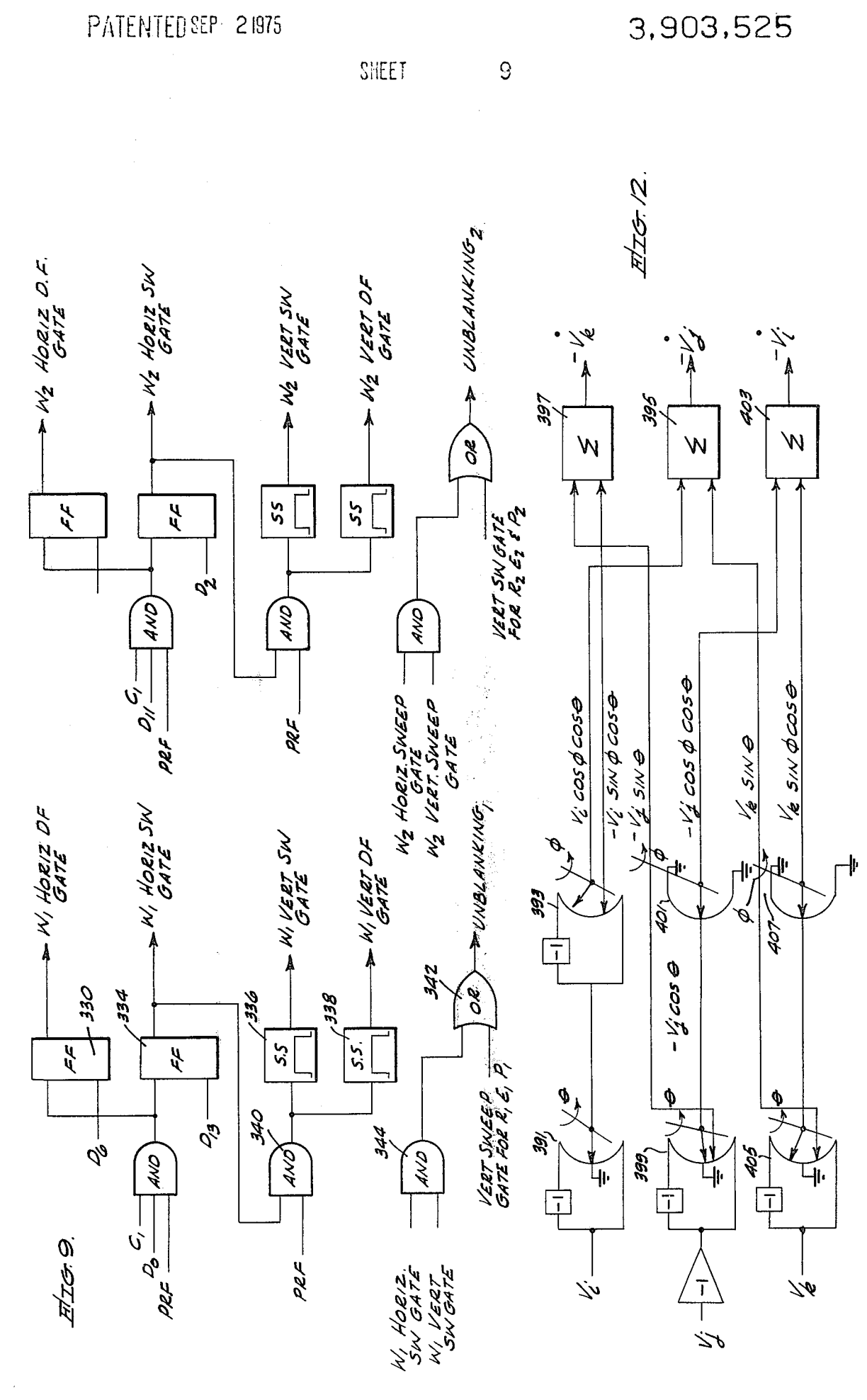

FIG. 9 is a schematic diagram of a portion of the timing control system of FIG. 7;

FIG. 10 is a schematic circuit diagram of a phase rotator that may be utilized in the system of FIG. 3 to convert noncoherent received signals to coherent signals;

FIG. 11 is a schematic circuit diagram of the space to aircraft coordinate resolvers that may be utilized in the system of FIG. 2 for developing the aircraft velocity function along the antenna line-of-sight;

FIG. 12 is a schematic circuit diagram of the aircraft coordinate resolvers that may be utilized in the system of FIG. 2 for developing the aircraft velocity rate signals along the antenna line-of-sight;

FIG. 13 is a schematic circuit diagram of the resolvers responsive to the aircraft velocity vectors to develop signals representative of the velocity along the line-of-sight of the antenna;

FIG. 14 is a schematic circuit diagram of the resolvers responsive to the aircraft velocity rate vectors to develop signals representative of the rate of change of line-of-sight velocity with antenna angle in a horizontal plane;

FIG. 15 shows schematic vector diagrams looking from the side and from the tail of an aircraft to show the space stabilized antenna angles;

FIG. 16 shows schematic diagrams of the aircraft reference axes looking from the top and from the side of the aircraft;

FIG. 17 is a schematic circuit diagram showing the phase selection of FIG. 6 for correcting the target signals to have a narrow spectral width;

FIG. 18 is a schematic circuit diagram of the step attenuator that may be utilized in the system of FIG. 6 to correct the spectral width of the target signal;

FIG. 19 is a schematic block diagram of the correlation oscillator of FIG. 6;

FIG. 20 is a schematic circuit diagram of one example of a wide band mixer that may be utilized in the system of FIG. 6;

FIG. 21 is a schematic diagram showing the antenna lobes relative to moving radar platform, a target and the reflectors adjacent or below the target for explaining the spectral width of the main lobe clutter signals;

FIG. 22 is a spectral diagram showing the folding of the radar signals around a one-half PRF (pulse repetition frequency) point and showing the frequency modulation of the clutter signals to a frequency equal to one-half PRF, in the system of the invention;

FIG. 23 is a schematic spectral diagram showing the operation of the clutter filter discriminator in the system of FIG. 3;

FIG. 24 is a schematic diagram of percent response versus frequency of the storage tubes that may be utilized in the system in accordance with the invention;

FIG. 25 is a schematic diagram showing the positioning of the doppler data on the screen of the storage tubes in the system of FIG. 2;

FIG. 26 is a schematic timing diagram showing wave forms of time versus voltage for the recording and reading operation of the storage tubes;

FIG. 27 is a schematic timing diagram including wave forms of voltage versus time for further showing the recording and reading operation on the storage tubes; and FIG. 28 is a schematic timing diagram of time versus voltage and time versus frequency for futher explaining the operation of the system of FIG. 2.

Figure 1:
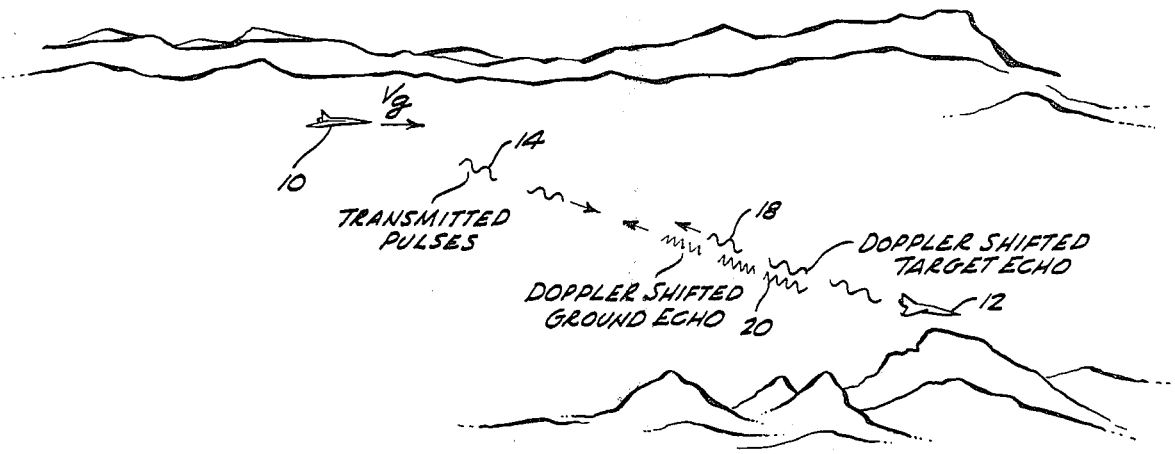
FIG. 1 is a drawing showing the operation of the doppler system of the invention to detect a moving target flying over terrain of varying reflection characteristics.

Referring first to FIG. 1, the radar system in accordance with the principles of the invention may operate in an aircraft or platform 10 over relatively rough surfaces such as ground or water surfaces to detect low flying aircraft such as a craft 12 or to detect slowly moving ground targets. However, it is to be understood that the principles of the invention are not limited to operation in any particular type of terrain or to operation from a moving platform or aircraft. The system may operate, in some arrangements in accordance with the principles of the invention, with a relatively low pulse repetition frequency to reduce the intensity of return clutter energy and to reduce the effect of side lobe clutter return signals. It is to be noted that the principles of the invention are applicable to operation at low, medium and high PRF such as over a PRF range of 100 pulses per second to 50,000 pulses per second, for example. Transmitted pulses of energy of a waveform 14 in one arrangement of the invention, may be derived from a magnetron having random starting phases. The reflected energy, which may include doppler shifted target echo signals of a waveform 18 and doppler shifted ground echo signals or main lobe clutter signals of a waveform 20, is then corrected in phase to provide coherent operation. In the low pulse repetition frequency system, range gating may be performed so that clutter energy is only passed into the system from a range interval including the target 12. Although the system of the invention is illustrated for tracking slow or fast moving targets, either in the air or on the surface such as ground or water, and in the presence of varying clutter return energy, it is to be understood that the principles of the invention are equally applicable to radar type systems operating as ground based radar for detecting either slow or fast moving targets in space or over or on any type of surface.

Referring now to FIG. 2, the system of the invention may operate with radar transmitter and receiver system 25 which may be either a coherent system or a noncoherent system with an arrangement for developing coherency upon signal reception. If a noncoherent radar system 24 is utilized which may include a magnetron or other random phase source of energy, a coherent or receive system 26 may be utilzed to render the phase of the signals of sequential pulses coherent, that is, the signals of each sequential pulse have a known phase relation. The coherent IF (intermediate frequency) signals are applied from the coherent system 26 to velocity compensation circuits 28 which establishes target doppler sensitivity with respect to stationary clutter echoes in the vicinity of the target. The coherent IF signals are compared to reference frequency of a variable frequency oscillator to develop corrections which are summed with predicted correction signals developed by a linear prediction circuit 30 so as to operate reliably during periods of a relatively small clutter return or the absence thereof. A navigator 32 applies aircraft velocity signals in space coordinates to the linear predictor circuit 30 and an antenna resolver circuit 34 applies antenna directional information in aircraft coordinate to the predictor circuit to predict the line-of-sight velocity $V_{LOS}$. The navigator 32 may be either a stable platform and an air data computer, an inertial guidance system, a doppler navigation system, or any type of system for developing velocity vector signals in space coordinates. Also, the principles of the invention are applicable to a system in which inertial guidance systems and digital or analog computers develop signals representative of velocity and antenna vectors.

The coherent IF signal is then applied from the velocity compensation circuit 28 to a modulator 29 to form a clutter referenced video signal with the centroid of the clutter spectrally shifted to a desired one-half PRF frequency so that the target signal appears over a range of low frequencies. The video signal is then applied to a storage processor 36 which may include a scan conversion device such as an electrical storage tube, a dielectric belt, a magnetic tape or a digital processing device in which the data is recorded in a line-scan fashion forming a field of range elements in a first dimension and time in a second orthogonal dimension. The stored data is then read in the orthogonal dimension (horizontal in the illustrated system) so that a plurality of contiguous range elements are sequentially examined. The storage device selected may have frequency characteristics responsive to the spectral region of the target signal and relatively unresponsive at higher frequency bands, thus providing filtering. Range gating is performed in the storage processor 36 and a signal including clutter signals at known frequencies and target signals at doppler frequencies due to the motion of the target over stationary ground, is applied to a clutter filter 40. The passband of the filter 40 which is a variable bandwidth filter, is controlled to pass those frequecies not occupied by clutter signals in response to a process control circuit 42. The clutter spectrum is a function of the aircraft velocity and the antenna look angles such that a signal proportional to the rate of change of line-of-sight velocity with antenna angle in a horizontal plane ($V_{LOS}$) is utilized to control the clutter filter.

The target signal spectrum after removal of clutter signals is applied from the clutter filter 40 to a target spectral control circuit 33 where the signal is mixed with a swept oscillator to remove the predictable frequency modulation imparted to the target signals as a result of the velocity compensation process. The signal $V_{LOS}$ controls this frequency correction to develop frequency modulations of first and second phases during two respective readings of the stored data, one correcting the frequency modulated target signal to its original spectral width. The corrected target signals are then applied to a bank of doppler filters and detectors of a circuit 48 and in turn to utilization device such as an azimuth-range display circuit 50 or to other processing circuits such as a computer or correlator.

Referring now to FIG. 3, the coherent radar system in accordance with the principles of the invention may operate in conjunction with the noncoherent system 24 utilizing a source of signals of random phase such as a magentron transmitter 54. The principles of the invention are also applicable to operation in conjunction with other types of transmitters and receivers such as phase locked coherent arrangements. The magnetron transmitter 54 may be maintained at a frequency $f_x$ or within a fraction of an MC (megacycle) of that frequency by a feedback circuit including an i–f discriminator 56 that generates a signal amplitude proportional to frequency variations to control a tuning servo 58. The magnetron transmitter 54 responds to a signal developed by the tuning servo to correct the frequency thereof to essentially that of the i–f discriminator 56. The transmitted energy is applied from the transmitter 54 through a duplexer 60 to the feed of an antenna 62 to be transmitted into space at an angle relative to the aircraft velocity vector determined by a scan control mechanism 64. Suitable devices may be included in the mechanism 64 to provide information as to azimuth antenna pointing angle $\eta$ and vertical antenna pointing angle $\xi$ relative to the aircraft axes. The transmitted energy may be reflected from reflectors such as targets and surfaces such as terrain, ground structures and water and is intercepted by the antenna 62 with a frequency $f_x + f_{ds}$ where $f_{ds}$ is the doppler shift caused by target movement and by the motion of the platform or antenna 62 relative to the illuminated patch on the earth's surface. The magnetron transmitter 54, the discriminator 56, the turning servo 58, the duplexer 60 and the antenna 62, which are devices well known in the art, may be included in a conventional low PRF noncoherent radar system 24, which may be utilized as a portion of the system in accordance with the invention. An advantage of a magnetron transmitter is the high power capability and the relatively simple control circuits.

Because the magnetron RF (radio frequency) signal is uncorrelated from pulse to pulse, a sample of the starting phase of each transmitted pulse is applied from the magnetron through a conductor 66 to a mixer 68 for phase comparison at RF frequencies with the signal developed at a stable reference frequency $f_x + f_o$ by a local oscillator 70. It is to be noted that the sample signal may be derived from other system locations such as utilizing the leakage energy from the duplexer 60. A stable reference oscillator 72 which provides the reference phase at IF frequency $f_o$, is applied to a phase detector 74 as well as through a 90° phase shifter 76 to a phase detector 78. The sampled signal at IF frequency is applied from the mixer 68 to the phase detectors 74 and 78 to develop error signals having DC amplitudes for each transmitted pulse corresponding to the instantaneous phase error between the reference oscillator 72 and the IF signal derived from the sampled magnetron RF signal. The error signals are stored in memory means such as box car circuits 80 and 82 for one interpulse period being gated by a PRF synchronizing pulse from radar control circuits 79 which may be included in the noncoherent radar system 24. The box car circuits 80 and 82 may be conventional diode ring types such as shown in the article by Paul E. Harris, "Radar Boxcar Circuits Using Nuvistors, Transistors and Zeners", in Electronics, Sept. 16, 1961, pages 66 to 67. Each box car circuit may include zener diodes to normally back bias semiconductor diodes and disconnect a capacitor from the source. A blocking oscillator pulse or radar synchronizing pulse from the transmitter provides a large circulating current through the diodes. The phase sensitive pulse from the phase detector diverts current to the capacitor to establish the stored error signal. A clamp signal may be utilized in response to a pulse (not shown) developed during the the radar transmission time.

The signals in the box car circuits 80 and 82 are applied to a phase rotator 84 which may include a pair of suppressed-carrier, balanced modulators driven in phase quadrature to develop a single side-band modulated signal. A mixer or cosine $\phi$ phase detector 86 responds to the phase correction signal of the form cos (wt + $\phi$) and to an IF signal $f_o - f_{ds}$ developed by a mixer or phase detector 88 which in turn responds to the local oscillator signal at frequency $f_x + f_o$ and the signal at $f_x + f_{ds}$ received from the duplexer 60. The mixer 86 applies a coherent signal $f_1 - \Delta S$ to a lead 90, which signal is applied through a range gate circuit 92, a signal actuated gate 67 and a narrow band filter 94 having a frequency centered at $f_1$, to a lead 96. The term $\Delta S$ represents the frequency error that is operating in a closed loop 95 of the velocity compensation circuit 28. A discriminator circuit 98 centered at the frequency $f_1$ applies the coherent IF signal through a switch 100 and a function generator circuit 102 to a summing circuit 104. The circuit 102 may include an amplifier 101 and a feedback path including a capacitor 103 and a resistor 105 to develop a low pass filter characteristic. A voltage controlled oscillator 108 operates at a frequency $f_o - f_1 - f_{ds} + \Delta S$ in response to the summing circuit 104 to apply the reference signal to the phase rotator 84. The loop 95 is a velocity compensation loop which measures the error between the frequency $f_1$ and the corresponding frequency of the VCO 108, for removing the doppler shift of the clutter signal, that is, maintaining the selected clutter spectral signal at the frequency $f_1$ or at $f_1 - \Delta S$, where $\Delta S$ is a small error. The switch 100 closes the loop when the prediction voltages have connected themselves or reached stable values such as during the start of a radar operation, and allows the loop 95 to lock into the central line of the clutter spectrum, that is, the clutter line in which the apparent doppler shift is insensitive to the pulse repetition frequency. The switch 100 may be operated either manually or electronically.

The range gate 92 which may be of a type well known in the art, may have a manual range control or may be controlled as a function of the expected terrain clearance and the antenna depression angle. It is to be noted that although the system may operate to pass the central line of the clutter at frequency $f_1$, the principles of the invention are applicable to passing other clutter lines at the frequency $f_1$.

The signal actuated gate 67 includes a transistor 71 having a transformer tuned as a collector load. Two diodes are provided which are forward biased during static conditions. The input signal is also passed to an amplifier and the threshold detector 73 which senses the peak signal level so that when the signal reaches the threshold of the detector a video signal is applied to the base of transistor 69. As a result, the transistor 69 conducts to open the two diodes. The impedance at the collector of the transistor 71 is then raised to a relatively high value and the clutter spectral signal is passed to the narrow band filter 94. For signals having less amplitude than the threshold the gain is very low and for high level signals the gain is raised. The threshold may be set to pass signals approximately 6 decibels, for example, above random receiver noise. The signal actuated gate 67 allows the open loop or the linear predictor 30 to operate in the absence of clutter signals without the closed loop tracking the noise signals.

The discriminator 98 has a voltage versus frequency characteristic (FIG. 23) to pass the central line of the spectrum and attenuate the remaining spectral lines, thus integrating all clutter signals passed through the range gate 92. The discriminator 98 provides an error signal as a second order correction and the linear predictor circuit 30 provides order corrections in response to the antenna resolver circuit 34 and aircraft velocity vectors $V_I$, $V_J$ and $V_K$ derived in space coordinates from the navigator 32 or other suitable source velocity signals. For example, the navigator 32 may be an inertial type guidance system having a gyro and sufficient gimbals to develop velocity vectors or may be a doppler navigation system as is well known in the art. For process control in the system, such as controlling the passband of the processor and correcting the spectral width of the target signals, a process control circuit 42 responds to the velocity vector signals from the navigator 32 to develop a signal $V_{LOS}$ representing rate of change of velocity along the antenna line-of-sight or $\delta V_{LOS}/\delta \eta$.

Doppler navigation systems are well known in the art as described on page 103 of "Introduction to Radar Systems" by Merril I. Skolnik, Mc-Graw-Hill Book Company, Inc., 1962 and as described in an article, "Navigating the Supersonic B-58", by Capt. William L. Polhemus, USAF, in Journal of Institute of Navigation, Summer-Autum 1960, Vol. 7, Nos. 2 and 3. Inertial navigation systems are well known in the art as described in Chapter 3 of "Principles of Inertial Navigation", by C. F. Savant, Jr., R. C. Howard, C. B. Holloway and C. A. Savant, by Mc-Graw-Hill Book Company, Inc., 1961 and in an article, "Effect of Component or Orthogonality on Aircraft Inertial Navigation System Errors", by M. Kayton and R. C. Gilbert in the Proceedings of the 1st American Institute of Aeronautics Astronautics Annual Meeting, Washington, D.C., June 29 – July 2, 1964.

The signal on the lead 90 corrected for clutter motion by maintaining the central line of the clutter spectrum centered at $f_1$, is applied to a mixer or cosine $\phi$ phase detector 120 which applies a clutter referenced video signal to a lead 122. A VCO (voltage controlled oscillator) 124 centered at frequency $f_1$ applies a signal to a one-half PRF modulator 126 also responding to a flip flop 127 being triggered by a radar synchronizing or PRF pulse. A phase detector 130 responds to the signal on the lead 96 and to the signal developed by the VCO 124 to apply a correction signal through a gain control circuit 132 to the VCO 124, to maintain the VCO phase locked with the signal on the lead 90. The circuit 132 may include an amplifier and feedback path including a series coupled capacitor and resistor coupled in parallel with a capacitor. In one arrangement in accordance with the invention, the modulator 126 may include a transformer 131 having a first winding coupled to the VCO 124 and a second winding with a center tap coupled to an output terminal of the flip flop 127. Oppositely poled diodes 133 and 135 may be coupled to the opposite ends of a second winding of the transformer 131 and through an inductor and capacitor to ground as well as to the mixer 120. The modulator 126 operates in response to a phase change at every interval of the pulse repetition frequency to provide a 180° PRF phase change a ½ PRF frequency offset (increase or decrease) of the signal developed thereby so that the central line of the clutter spectrum is centered at a frequency of ½ PRF when folding in the mixer 120 to DC. Thus in the system of the invention the target signal is established within the region of desirable frequency response of the storage device of the processor.

Figure 4:
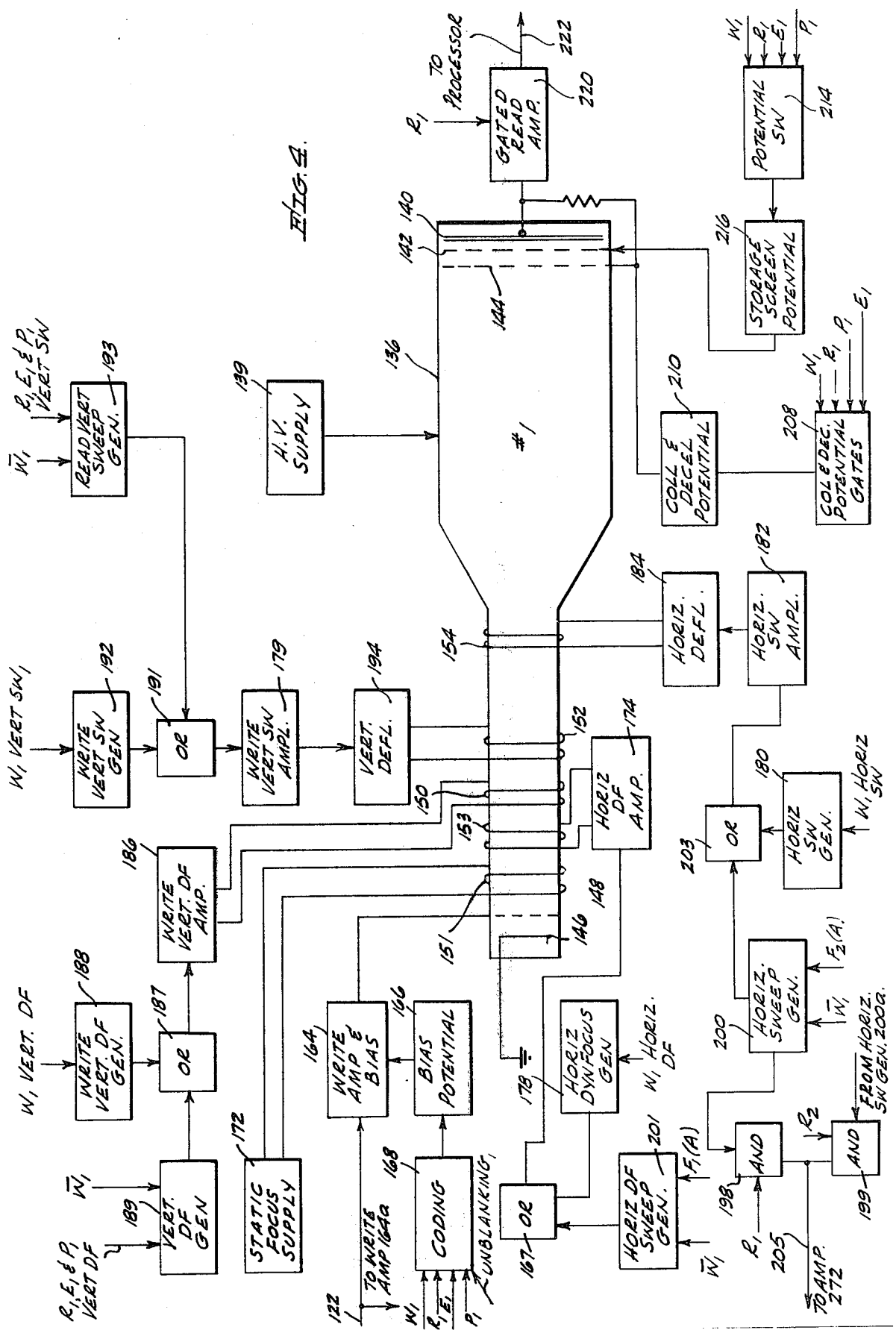
FIG. 4 is a schematic diagram of one of the storage tubes that may be utilized in the storage processor of FIG. 2.
Figure 5:
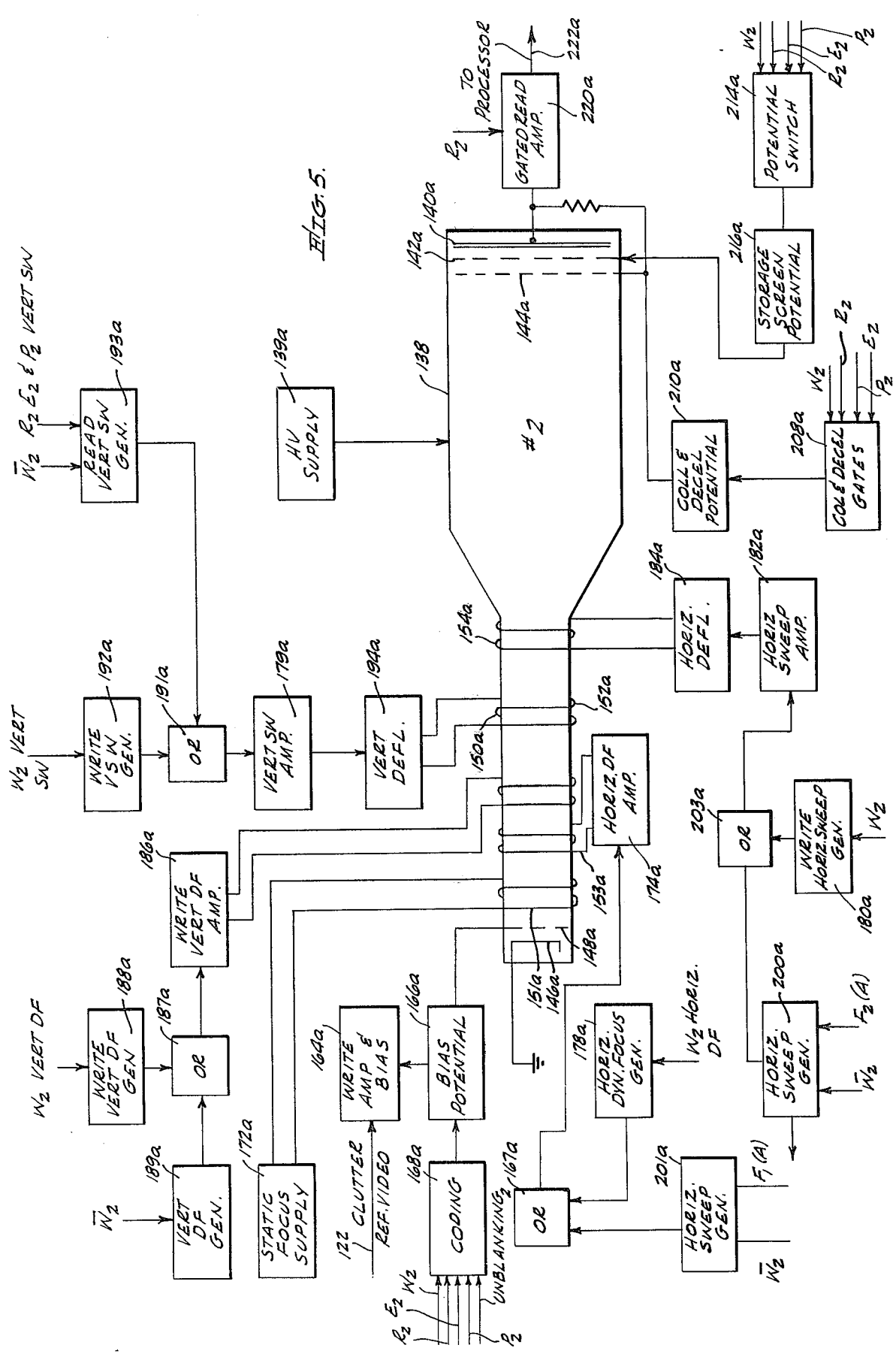

The clutter referenced video signal on the lead 122 is then applied to write amplifier and bias circuits 164 and 164a of FIGS. 4 and 5 for controlling the intensity grids of storage tubes 136 and 138. The storage tubes in the illustrated system may be any conventional recording storage tube such as Raytheon CK7571/QK685. It is to be noted that the principles of the invention are not to be limited to storage tubes or to any particular type of storage tubes but any suitable storage device may be utilized such as magnetic tapes or surfaces or digital type memory systems. The illustrated storage tube 136 of FIG. 4 has a collector 140, a storage surface 142, a decelerator grid 144, a cathode 146, an intensity grid structure 148 and other control grids, collimating lenses and anodes controlled from a high voltage supply circuit 139 as is well known in the art. The tube 136 is utilized with a vertical deflection dynamic focus (DF) coil 150, a horizontal deflection focus coil 153, a vertical deflection coil 152, a horizontal deflection coil 154 and a static focus coil 151, all of which may be conventional type deflection yokes. The storage tube 136 is utilized with four typical operations; prime, write, read and erase. Priming is accomplished by uniformly charging the storage surface with the screen voltage reduced below a critical potential while the raster is scanned. During writing, a suitable quiescent (mid-gray scale) bias and a signal of desired amplitude controls the intensity grid. During reading, the grid bias is set to provide a suitable unmodulated beam utilized to scan the raster and resulting in the stored signal forming a beam modulation which is detected at the collector. During erasing, a DC signal is written into the tube to normalize the storage surface at full modulation level. The tube 138 of FIG. 5 includes similar components and functions in a similar manner.

The write amplifier and bias circuit 164 responds to the clutter referenced video signal to apply a modulation to the intensity grid 148. A source of bias potential 166 controls the grid bias in response to timing signals $W_1$, $R_1$, $E_1$ and $P_1$, respectively representing write, read, erase and prime, which may be decoded in a coding circuit 168 for selecting the desired bias potential during each operation. An unblanking pulse is also applied to the coding circuit 168. A static focus supply 172 applies vertical deflection signals to the static focus coil 151. For providing focusing as a function of the vertical sweeps, a read vertical dynamic focus generator 189, a write vertical dynamic focus generator 188 apply signals through an OR gate 187 to a vertical deflection amplifier 186 and in turn to the vertical focus coil 150. During writing, a horizontal dynamic focus generator 178 applies a signal through an OR gate 167 and a horizontal deflection amplifier 174 to the horizontal focus coil 153. During reading, a horizontal DF sweep generator applies a dynamic focus signal through the OR gate 167 to the coil 153 in response to $\overline{W}_1$ and $F_1(A)$. The vertical dynamic focus generator 189 responds to a signal $\overline{W}_1$ which is at a fixed level in the absence of writing in the tube 136 and to a $R_1$, $E_1$ and $P_1$ vertical deflection gate signal. The generator 188 responds to a $W_1$ vertical DF gate signal to provide vertical dynamic focusing during each vertical sweep of writing. A $W_1$ horizontal DF (deflection) timing signal is applied to the vertical dynamic focus generator 178 which applies a sweep signal through the OR gate 167 to the amplifier 174. During writing or recording, the video data is recorded in vertical lines each representing a range sweep with the horizontal position representing antenna azimuth position. During reading, the recorded data is read horizontally to simultaneously read a plurality of signals at the same range interval with the vertical sweep occurring in a relatively short period of time. As will be explained subsequently, reading is performed with a triangular or "jizzle" waveform in the horizontal dimension and a range sweep in the vertical dimension. To provide correction of a frequency modulation derived from the motion compensation, the same stored data is read twice from each tube with the triangular waveform.

For writing, a $W_1$ horizontal sweep timing signal is applied to a horizontal sweep generator 180 which applies a sweep signal through an OR gate 203 to a horizontal sweep amplifier 182 and to a horizontal deflection circuit 184 which in turn controls the horizontal sweep coil 154. Also for writing, a $W_1$ vertical sweep timing signal is applied to a write vertical sweep generator 192 which applies a vertical sweep signal through an OR gate 191 and a write vertical sweep amplifier 190 to a vertical deflection circuit 194, which in turn controls the vertical deflection coil 152.

During reading, a $\overline{W}_1$ vertical sweep timing signal and a $R_1$, $E_1$ and $P_1$ vertical sweep timing signal are applied to a read vertical sweep generator 193 which applies a vertical sweep signal to the OR gate 191 to control the vertical deflection coil 152. To control the horizontal position during reading, a horizontal sweep generator 200 responds to signals $\overline{W}_1$ and $F_2(A)$ to develop the triangular or jizzle waveform which is applied to the OR gate 203. During prime and erase operations, the vertical sweep generator 193 controls the vertical deflection coil 152 and the generator 200 controls the horizontal sweep. During write, read, erase and prime, $W_1$, $R_1$, $E_1$ or $P_1$ timing signals are applied to a decelerating potential gate circuit 208 which energizes a collector and decelerating potential circuit 210 for applying required potentials to the decelerator screen 144 and to the collector 140. Also, potential switch circuits 214 respond to timing signals $W_1$, $R_1$, $E_1$ and $P_1$ to control a storage screen potential circuit 216 to apply the required potential to the storage screen 142. The readout signal is applied from the collector 140 through a gated read amplifier 220 controlled by a read timing signal $R_1$ which applies the interrogated signal to a lead 222. The horizontal sweep generator 200 applies triangular signals to an AND gate 198 which responds to the $R_1$ signal to apply the signal to a lead 205 for controlling frequency correction during processing. The elements for controlling the storage tube 138 of FIG. 5 are similar to those of FIG. 4 and similar elements are designated with similar reference numerals except followed by the subscript a. The horizontal sweep generator 200a is coupled to an AND gate 199 responsive to the signal $R_2$ to apply the triangular signal to the lead 205.

Referring now to FIG. 6, the video signals read from the storage tubes 136 and 138 during each vertical read sweep (two consecutive vertical read sweeps at each tube) are applied to a variable width clutter filter 230 which may include a plurality of gated amplifiers such as 232, 234 and 236, each in a different parallel channel, to apply the signals of respective filters 238, 240 and 242. As shown by spectral diagrams 244 and 246, the passband may be selected to be progressively narrower (or the rejection band progressively wider) between filters 238 and 242 so that a wider spectral width of clutter is rejected. The gated amplifiers are controlled through leads such as 233 and 237 in response to the $V_{LOS}$ signal which is applied to an analog to digital converter 248 to develop a five bit binary number, for example. The digital number is applied in parallel, for example, to a register 250 in response to timing signals $S_1$ or $S_2$. The register 250 may include 5 flip flops and be of a type well known in the art being responsive to a register clock pulse $RC_1$ or $RC_2$ to fill the register with new data at the center of each write cycle and prior to reading. A $V_{LOS}$ signal for each selected sector of antenna azimuth scan is available to be utilized when the corresponding data is read from a storage tube. A decoder unit 254 responds to the contents of the register 252 to develop a signal on one of 32 output leads coupled to a mask logic circuit 256. As is well known in the art, the mask circuit 256 may be a diode gating structure so that every other count selects a different lead such as 233 and 237 to apply an output gate signal to the selected gated amplifier. Thus, sixteen leads may be coupled to different ones of sixteen gated amplifiers to select a clutter filter having a width matched to the average clutter width of an azimuth sector of 280 radar sweeps or pulse transmissions in the illustrated system, or during approximately one-tenth of the total azimuth scan angle.

The output terminals of the filters such as 238, 240 and 242 are applied to an exclusive "or" summing circuit 260 which passes a spectral region below the removal clutter signal through an amplifier 262 to a lead 264. A balanced mixer 266 responds to the video signal including the target signal to develop a frequency translation to return the target signal to its narrow spectral width. A correlation or swept oscillator 268 is coupled to the mixer 266 and responds to a step attenuator 270 which selects a frequency range for sweeping the target signal in response to the decoded rate of velocity change developed by the decoder 254 and applied to the step attenuator 270 through a composite lead 259 which may include 32 wires. For changing the phase of the frequency correction during the two periods of reading data from the storage tube 136 or 138, a paraphase amplifier 272 responds to the triangular horizontal read signal on the lead 205 to apply the signal through a phase selection circuit 274 which responds to a vertical read synchronizing pulse that occurs prior to each period of reading. It is to be noted that the vertical sweep gate signals for $R_1$ and $R_2$ (FIG. 8) may be utilized after passing through an OR gate (not shown) as the vertical synchronizing pulse.

The video signal with clutter removed and the target signal having its spectral width corrected during one reading period for improved signal to noise radio, and translated to a greater spectral width during the other reading period of the same data, is applied from the mixer 266 through an amplifier 280 to doppler filters such as 282 and 284 of a doppler filter bank 286. It is to be noted that the filter bank 286 is utilized for each range interval read from the tube so that only a relatively few filters such as twenty-eight are required for doppler filtering during searching. The signals applied through the doppler filters such as 282 and 284 are then applied to respective detectors 288 and 290. Any conventional type of detectors may be utilized such as a means level detector shown in U.S. Pat. No. 3,057,955, Mean Level Detector by Samuel Thaler. An OR gate 290 which may be of the inclusive or type, responds to the detected signal to apply the signal through a video threshold detector 292 and an AND gate 294 controlled by a sweep pulse for $R_1$, $E_1$ and $P_1$ of the waveform 698 (FIG. 26) or a sweep pulse for $R_2$, $E_2$ and $P_2$ combined in an OR gate (not shown). The detected signals are applied from the AND gate 294 to a range-azimuth display system 296. An AND gate 298 responds to an OR gate 299 in turn responsive to signals $R_1$ or $R_2$ to develop a range sweep for providing the vertical deflection of the beam in the display tube. Because the azimuth or $\eta_s$ position is delayed, a register 304 delays the $\eta_S$ signal, from each azimuth sweep sector, before controlling the horizontal or azimuth beam position of the display tube. Signals $S_1$ or $S_2$ and $RC_1$ or $RC_2$ gate the digital data in parallel into the azimuth register 304. A digital to analog converter 307 may respond to the contents of the register 304 to apply a step voltage to provide azimuth or horizontal positioning of target signals such as 740 and 742.

Referring now to FIGS. 7, 8 and 9, the timing control system may include a clock 312 operating at 200 KC (kilocycles) in the illustrated system. It is to be understood that the illustrated timing frequency and intervals is only for ease of understanding and is not to limit the scope of the invention to any particular frequency or timing arrangement. Counters A, B, C and D of respective circuits 314, 316, 318 aand 320, respectively including 2, 5, 5 and 5 flip flops, may be utilized in series for providing respective divisions of 4, 25, 20 and 22. As is well known in the art, each of the counters may include a gate responsive to a selected count such as the count of 21 for the D counter to energize a single shot circuit and apply a pulse to a reset gate at the end of the count 21. Also, the C counter may be arranged to include a binary counteer and a decade counter. The counters may either use internal translation clocking or other clocking arrangement as are well known in the art. A jizzle or triangular logic circuit 322 responds to the counter a to develop DF gate signals $F_1(A)$ and SW gate signals $F_2(A)$ for controlling both storage tubes. A circuit 324 also responds to the counters C and D and to a PRF or synchronizing pulse to develop the signals $W_1$, $R_1$, $E_1$, $P_1$, $W_1$ Horiz. sw. gate or pulse, $W_1$ Vert. sw. gate for controlling the storage tube 136 and similar signals for the storage tube 138 as well as other signals as will be explained subsequently. Referring temporarily to the waveforms of FIGS. 26 and 27, the decoded states of the counters C and D are shown as $D_0$ to $D_{21}$, which states are continually repetitive. The $W_1$ write period of a waveform 690 occurs between $D_0$ and $D_{13}$, the $R_1'$ period of a waveform 694 occurs during $D_{14}$ and $D_{15}$, the $E_1$ period of a waveform 703 occurs during $D_{16}$ and $D_{17}$ and the $P_1$ period of a waveform 708 between $D_{18}$ and $D_{21}$. The $R_2$ period of a waveform 696 occurs during $D_3$ and $D_4$, the $E_2$ period of a waveform 714 occurs during $D_5$ and $D_6$, the $P_2$ period of a waveform 716 occurs during $D_7$ to $D_{10}$ and the $W_2$ period of a waveform 692 occurs from $D_{11}$ through $D_2$. The $W_1$ horizontal sweep pulse of a waveform 717 occurs between a $C_1$ time after $D_0$ through $D_{13}$ and the $W_2$ horizontal sweep pulse of a waveform 719 occurs between a $C_1$ time after $D_{11}$ through $D_2$.

As shown in FIG. 8, set-reset type flip flops are coupled to the D terms to develop the $W_1$, $\overline{W}_1$, $R_1$, $E_1$ and $P_1$ terms for the first tube as well as similar terms for the second tube. For developing the vertical sweep gate signal for $R_1$, $E_1$ and $P_1$ of a waveform 698, and AND gate 316 responds to the $\overline{W}_1$ signals and a signal from the true terminal of a flip flop 318 which is respectively set and reset in response to terms $C_1$ and $C_{19}$. The vertical dynamic focus signal for $R_1$, $E_1$ and $P_1$ of a waveform 710 is developed by an AND gate 320 in response to $\overline{W}_1$ and a signal from the true terminal of a flip flip 322 being respectively set and reset in response to terms $C_1$ and $C_{10}$. The vertical sweep pulse and the vertical deflection pulse for $R_2$, $E_2$ and $P_2$ are developed in a similar manner in response to AND gates 324 and 326 responding to $\overline{W}_2$ as well as to the flip flop 318 and 322. A vertical sweep gate signal for $R_1$ and a vertical sweep gate signal for $R_2$ are developed in respective AND gates 317 and 319 for controlling the paraphase amplifier of FIG. 6. Gating signals $S_1$ and $S_2$ and clocking signals $RC_1$ and $RC_2$ are also developed by flip flops for the process control and the display, as will be subsequently explained in further detail.

Referring also to FIG. 9, the $W_1$ horizontal deflection timing pulse of a waveform 697 (FIG. 27) is developed by a flip flop 330 being set in response to an AND gate 332 and being reset in response to the term $D_6$. The AND gate 332 responds to $C_1$ and $D_0$ and to a PRF pulse of a waveform 699. The write horizontal sweep pulse of the waveform 717 is developed by a flip flop 334 being set in response to the AND gate 332 and reset in response to the term $D_{13}$. The $W_1$ vertical sweep gate signal of a waveform 701 and the $W_1$ vertical DF pulse of a waveform 703 are developed by respective single shot circuits 336 and 338 being triggered by an AND gate 340 in turn responsive to the flip flop 334 and the PRF pulse. An unblanking pulse of a waveform 705 for the tube 136 is developed by an OR gate 342 responsive to an AND gate 344 or to the vertical sweep gate pulse from the gate 316 (FIG. 8). The signals of the waveforms 701, 703 and 705 during $W_1$ time occur at each PRF pulse which may be at each 0.5 millisecond while the D periods may be of 10 milliseconds duration. The AND gate 344 responds to the $W_1$ horizontal sweep gate pulse of the waveform 717 and the $W_1$ vertical sweep gate pulse of the waveform 701. Similar gating pulses are developed for the second tube 138 as is shown in FIG. 9. It is to be noted that the $W_1$ horizontal DF pulse, the $W_1$ horizontal sweep pulse, the $W_1$ vertical sweep pulse, the $W_1$ vertical DF pulse and the unblanking pulse, as well as similar signals for the tube 138, are initiated at time $C_1$ after other voltage switching is completed at the storage tubes, before starting the deflection sweeps.

Referring now to the circuit diagram of FIG. 10, the phase rotator 84 utilized in the system of FIG. 3 to provide coherent operation responds at leads 81 and 83 to the quadrature voltage signals stored in the box car circuits 80 and 82 for each transmitted pulse. The frequency correction signal for velocity compensation is applied from the lead 109 to a transformer 350 as well as through a 90 degree phase shifter 352 to a transformer 354. The secondary windings of the transformers 350 and 354 which are center tapped to ground are respectively applied to diode rectifier bridges 356 and 360 to control current flow as a function of the amplitude of the signals on the lead 81 and 83 and are coupled to center taps of respective windings 362 and 364 of transformers 366 and 368. Secondary windings 370 and 372 are coupled between ground and a lead 374 to which the amplitude controlled signals are applied for summing in a summer 375. The summed signals are applied to the lead 85 as the phase shifted and frequency corrected signal of a form $\cos(wt + \phi)$.

Referring now to FIGS. 11, 15 and 16, the linear predictor circuit 30 of FIG. 3 includes a space to aircraft converting circuit that responds to velocity vectors $V_I$, $V_J$ and $V_K$ in horizon stabilized (earth oriented coordinates unresolved for compass heading) coordinates to develop velocity vectors $V_i$, $V_j$ and $V_k$ in aircraft coordinates. As may be seen in FIG. 15, the $V_I$ vector is horizontal to the earth's surface, the $V_J$ vector is at right angles to $V_I$ and parallel to the surface of the earth and the $V_K$ vector is vertical or at right angles to the surface of the earth. The pitch angle $\theta$ is the angle below the $V_I$ vector and the roll angle $\phi$ is the antenna angle of the aircraft vector $V_J$ in a vertical plane from the $V_J$ vector. Inertial type stable platforms or doppler navigator systems having heading resolvers for developing these space or horizon stabilized reference vectors are well known in the art. As shown in the aircraft coordinate diagram of FIG. 16, the vector $V_i$ is parallel to the longitudinal or thrust axis of the aircraft, $V_j$ is parallel to the wings and at right angles to $V_i$ and $V_k$ is at right angles to $V_i$ and $V_j$. Lines 380 are the antenna line-of-sight or boresight axis and are at an azimuth angle $\eta$ from the vector $V_i$ and at an elevation or depression angle $\xi$ below the $V_i$ or axis. The elevation angle with respect to the horizon is $\xi s$ and the azimuth angle in a horizontal plane parallel to the horizon is $\xi_S$. If no pitch or roll is present, the $\eta$ and $\xi$ angles of FIG. 16 respectively correspond to $\eta_S$ and $\xi_S$. The resolving may be performed by any suitable resolver such as sine-cosine potentiometers which are nonlinear resistance devices developing an output voltage equal to the input voltage times the sine or cosine of the input angular shaft position. Resolver circuits of this type are well known in the art and will not be explained in further detail. It is to be noted that although in the illustrated system the values $\eta$ and $\xi$ are restrained to less than $\pm 90°$ the principles of the invention are applicable to resolving systems over any desired number of angular degrees.

Referring now principally to FIG. 11, the vector signal $V_I$ is applied to a $\theta$ resolver 390 which applies a $V_I \cos \theta$ term to a summer 392 and a $V_i \sin \theta$ to a $\phi$ resolver 394. Terms $V_I \sin \theta \cos \phi$ and $V_I \sin \theta \sin \phi$ are applied from the resolver 394 to respective summers 396 and 398. The $V_J$ signal is applied to a $\phi$ resolver 400 which in turn applies a term $V_J \cos \phi$ to the summer 398 and a term $-V_J \sin \phi$ to the summer 396. The signal $V_K$ is applied to a $\theta$ resolver 402 which in turn applies a term $V_K \cos \theta$ to a resolver 404 and a term $-V_K \sin \theta$ to the summer 392. The $\phi$ resolver 404 applies a term $V_K \cos \theta \cos \phi$ to the summers 392 and 396 and a term $V_K \cos \theta \sin \phi$ to the summer 398. The summers 392, 398 and 396 respectively develop the signals $V_i$, $V_j$ and $V_k$ in aircraft coordinates. The conversion circuit of FIG. 11 may be expressed by the following equations:

$V_i = V_I \cos \theta = V_K \sin \theta$
$V_j = V_J \cos \phi + V_K \cos \theta \sin \phi + V_I \sin \theta \sin \phi$
$V_k = V_K \cos \theta \cos \phi + V_I \sin \theta \cos \phi - V_J \sin \phi$.

Referring now to FIG. 12, the rate of change of velocity along the antenna line-of-sight due to antenna scan, or the partial derivative of velocity with $\eta_S$, may be developed in the process control circuit 42 in response to the velocity vectors in aircraft coordinates. A $\theta$ resolver 391 responds to $V_i$ to apply a term $V_i \cos \theta$ to a $\phi$ resolver 393 which applies a term $V_i \cos \phi \cos \theta$ to a summer 395 and a term $-V_i \sin \phi \cos \theta$ to a summer 397. A $\phi$ resolver 399 responds to $V_j$ to apply a $-V_j \cos \theta$ term to a $\phi$ resolver 401 which in turn applies a term $-V_j \cos \phi \cos \theta$ to a summer 403. The resolver 399 also applies a term $-V_j \sin \theta$ to the summer 397. A $\theta$ resolver 405 responds to the $V_k$ signal to apply a term $V_k \cos \theta$ to a $\phi$ resolver 407 which applies a term $V_k \sin \phi \cos \theta$ to the summer 403. The resolver 405 also applies a term $V_k \sin \theta$ to the summer 395. The summers 397, 395 and 403 develop the respective velocity rate vector terms $V_i$, $V_j$ and $V_k$ in aircraft coordinates.

The following equations also express the operation of the circuit of FIG. 12.

$-V_i = V_k \sin \phi \cos \theta - V_j \cos \phi \cos \theta$
$-V_j = V_k \sin \theta + V_i \cos \phi \cos \theta$
$-V_k = -V_j \sin \theta - V_i \sin \phi \cos \theta$ Referring now to FIG. 13, the line-of-sight velocity signal $V_{LOS}$ is developed in response to the signals $V_i$, $V_j$ and $V_k$ in aircraft coordinates. An $\eta$ resolver 410 responds to the signal $V_i$ to apply a term $V_i \cos \eta$ to a summer 412. An $\eta$ resolver 414 responds to the signal $V_j$ to apply a term $V_j \sin \eta$ to the summer 412. The summer 412 applies a signal to an $\xi$ resolver 416 which applies a term $V_i \cos \eta \cos \xi + V_j \sin \eta \cos \xi$ to a summer 418. An $\xi$ resolver 420 responds to the signal $V_k$ to apply a term $V_k \sin \xi$ to the summer 418 which in turn develops the signal $V_{LOS}$ as a function of the antenna angles $\eta$ and $\xi$ and the aircraft velocity vectors. The equation for developing $V_{LOS}$ is:

$V_{LOS} = V_i \cos \eta \cos \xi + V_j \sin \eta \cos \xi - V_k \sin \xi$

Referring now to FIG. 14, the process control signal $V_{LOS}$ is developed by resolver structure similar to that of FIG. 13 except the terms $V_i$, $V_j$ and $V_k$ are utilized as developed by the circuit of FIG. 12. The resolvers and summers of FIG. 14 are similar to those of FIG. 13 and have similar reference numerals followed by the subscript $a$. It is to be noted that the resolvers and summers of FIGS. 13 and 14 are shown with more detail than those of FIGS. 11 and 12 to illustrate a typical arrangement in accordance with the invention.

Referring now to FIG. 17, the paraphase amplifier 272 and the phase selection circuit 274 will be explained in further detail. To reverse the phase of the signal correction signal during each sequential one of two read rasters for each storage tube (each storage surface of data being read twice) a flip flop 440 responds to a vertical sweep pulse for $R_1$ or a vertical sweep pulse for $R_2$ developed by AND gates 317 and 319 of FIG. 8 to be alternately set and reset and apply a high or a low voltage to a lead 442. The flip flop 440 is of a type well known in the art and will not be explained in further detail.

When the signal on the lead 442 is at a low or approximately ground level, a diode 444 is biased into conduction and an npn type transistor 446 is biased out of conduction to apply a positive potential to a lead 448 which biases a pnp type transistor 472 out of conduction. A zener diode 445 is coupled between the base of the transistor 446 and the anode of the diode 444. Diode bridge circuits 450 and 452 respectively include diodes 451, 453, 463 and 465 and diodes 455, 457, 459 and 461. The cathode and anode of respective diodes 463 and 451 are coupled through a lead 454 to the emitter of an npn type transistor 458 and the cathode and anode of respective diodes 455 and 459 are coupled through a lead 456 to the collector of the transistor 458 of the paraphase amplifier circuit 272. The base of the transistor 458 is coupled to the lead 205 to respond to the triangular or jizzle signal and the collector and emitter are coupled to suitable sources of biasing potential. The collector of the transistor 446 is coupled through resistors 462 and 464 to a second terminal of the bridge circuit 450 at the anodes of the diodes 463 and 465. A -22 volt terminal 468 is coupled through a transistor 470 to a point between the resistors 462 and 464 as well as to a second terminal of the bridge circuit 452 at the cathodes of the diodes 459 and 461. The transistor 472 has a base coupled through a zener diode 474 and a diode 476 to the lead 448, an emitter coupled to ground and a collector coupled through a suitable resistor to a -25 volt terminal 474 as well as through resistors 476 and 478 to a third terminal of the bridge circuit 452 at the anodes of diodes 455 and 457. A +22 volt terminal 480 is coupled through a resistor 482 to a point between the resistors 476 and 478 which in turn is coupled to the cathodes of the diodes 451 and 453. The other terminals of the bridges 450 and 452 respectively at the cathode and anodes of diodes 457 and 461 and at the cathode and anode of diodes 465 and 453 are coupled to a lead 490 and through an amplifier 492 to the lead 275 which is in turn coupled to the step attenuator 270 of FIG. 6.

In operation, when a low voltage is applied to the lead 442, the transistor 446 is biased out of conduction and a positive potential is applied to the resistor 462 to increase the conduction of the diodes 463 and 465 of the bridge circuit 450 and to bias the transistor 472 out of conduction. Also, the diodes 459 and 461 are biased out of conduction. The −25 volts is applied from the terminal 474 to bias the diodes 455 and 457 of the bridge circuit 452 out of conduction. Also, the diodes 451 and 453 of the bridge 450 are biased into conduction. The signals on the leads 454 and 456 are 180° out of phase. The ratio of the conductance of the diode bridges determines the phase of the triangular signal applied to the lead 490, changing 180° in response to the flip flop 440. When the voltage is at a high level on the lead 442, the transistors 446 and 472 are biased into conduction to bias the diodes of the bridge circuit 450 out of conduction and the diodes of the bridge circuit 452 into conduction to shift the phase of the signal on the lead 490 by 180°. The phase of the signal on the lead 490 changes at each vertical synchronizing pulse during reading from a storage tube so that two frequency translations are provided of the target signal, one developing the desired narrow spectrum.

Referring now to the step attenuator circuit 270 of FIG. 18, the triangular signal alternately changing phase during each of two readings of the data on the storage screen of a tube is applied from the lead 275 through suitable biasing elements to the base of an npn type transistor 510 having a collector coupled through an inductor 511 and a resistor 512 to a suitable source of potential such as a +22 volt terminal 514. The collector of the transistor 510 is also coupled through a coupling capacitor to the base of an npn type transistor 516 having a capacitor coupled to the terminal 514 and an emitter coupled through a resistor 518 to ground. The emitter of the transistor 516 is also coupled through a suitable coupling capacitor to the lead 267 on which a triangular waveform of selected slope and phase controls the frequency sweeping range of the correlation oscillator 268 of FIG. 6. The amplitude of the signal on the lead 267 is controlled at the emitter of the transistor 510 which is coupled through an indicator 520 and a resistor 522 to ground for providing a high AC (alternating current) impedance to ground. A field effect transistor 524 has a first electrode coupled through a capacitor 526 to the emitter of the transistor 510 and a second electrode coupled to ground. The control terminal of the transistor 524 is coupled through a capacitor 528 to the capacitor 526 as well as through a resistor 530 to a −10 volt terminal 532. The field effect transistor 524 may be any conventional type such as a 2N2498, as is well known in the art. The control terminal of the transistor 524 is also coupled through a resistor 534 to the collector of a pnp type transistor 538 having a base coupled to a +10 volt terminal 540 and an emitter coupled through a dividing resistor 542 to the terminal 514.

The emitter of the transistor 538 is also coupled to a lead 544 which in turn is coupled through a plurality of resistors such as 546, 548, 550 and 552 to the cathodes of respective diodes 554, 556, 558 and 560. The cathode of each of the diodes such as 554 and 556 is coupled to a lead of the composite lead 259 from the decoder 254 (FIG. 6) on which a signal which may be normally at 12 volts is switched to 0 volts on a selected line as determined by the digital value of the decoded line-of-sight velocity rate. The values of the resistors increase from the resistors increase from the resistor 552 to the resistor 546 so that ground potential applied to a diode connected to an increased resistor value develops an increased value of voltage on the lead 544 and an increased current flowing into the emitter of the transistor 538. An increase of voltage on the lead 544 increased the impedance through the transistor 524 to increase the gain of the transistor 510 and increase the amplitude of the signal on the lead 267. Thus the frequency excursion of the correlation oscillator 268 increases with a voltage rise on the lead 544 so that the diodes 554 and 556 are connected to respond to the higher values of $\dot{V}_{LOS}$. It is to be again noted that the triangular waveform on the lead 494 changes phase during each vertical read sweep. The digital value of $\dot{V}_{LOS}$ is changed each write period so that a new value is utilized from each scan sector defined by the number of vertical lines recorded on each tube.

Referring now to FIG. 19, the correlation oscillator 268 may include a paraphase amplifier 570 responsive to the triangular waveform on the lead 267 of a waveform 572 to develop signals (180 degrees out of phase) of waveforms 574 and 576 on leads 578 and 580, which signals are applied to first and second voltage controlled oscillators 582 and 584. A mixer 586 or cos $\phi$ phase detector responds to the signals developed by the oscillators 582 and 584 to apply a signal through an amplifier 580, a clipper circuit 582 and an amplifier 584 to the lead 269 for controlling the swept frequency of the balanced mixer 266 of FIG. 6. The oscillators 582 and 584 may be selected to operate with respective center frequencies of 140 MC (megacycles) and 173.6 MC each with a frequency range of ± 4.4 MC as an illustration of their operation. The mixed signal may be centered at 33.6 MC with ± 11.2 MC variation to provide a correlation oscillator with a relatively wide dynamic range. It is to be noted that other types of voltage controlled oscillator systems as well known in the art may be utilized for the correlation oscillator 268 in accordance with the principles of the invention.

Referring now to FIG. 20, a circuit that may be utilized for the balanced mixer 266 of FIG. 6 includes a mixing capacitor 586 coupled between the lead 264 and a resistor 588 in turn coupled to a voltage null point 589 which is coupled to resistors 590 and 592 and to a tap 594 of a resistor 596. The resistors 590 and 596 are coupled to the anode of a diode 598 and the resistor 592 and the other end of the resistor 596 are coupled to the cathode of a diode 600. Capacitors 602 and 604 are each coupled between ground and the anode of the diode 598 and capacitors 606 and 608 are each coupled between ground and the cathode of the diode 600.

A transformer 612 includes a winding 614 having a center tap coupled to ground and the first and second ends respectively coupled to the cathode of the diode 598 and to the anode of the diode 600 for applying signals thereto 180 degrees out of phase from each other. The signal on the lead 269 is applied through a coupling capacitor 616 to a first end of a winding 618 of the transformer 612, the other end of the winding being coupled to ground. The point 589 is coupled through suitable coupling capacitors to the lead 271 where the alternately frequency corrected and uncorrected target signals are applied to the doppler filter bank 286 of FIG. 6. The mixer of FIG. 20 operates in a conventional manner with the diodes 598 and 600 to balance out and cancel, at the null point 589, components of the signal on the lead 269 and apply the heterodyned signal to the lead 271.

Referring now to FIG. 3, the operation of the system in accordance with the invention will be explained in further detail. The moving target detection system may operate with a noncoherent radar system to provide improved moving target detection capabilities while retaining the advantages of a relatively simple and high power transmitter such as a magnetron transmitter. Also, it is to be understood that the principles of the invention are applicable to other types of coherent radar transmitters and receivers as well known in the art. Although the illustrated system operates in a highly desirable manner at low or medium PRF, it is to be also understood that the principles of the invention are applicable to all ranges of pulse repetition frequency. Although the features of the system are especially desirable during searching operations such as during azimuth or elevation scanning, it is to be noted that the principles of the invention are also applicable to tracking and to other types of scanning patterns. The magnetron transmitter in response to a PRF synchronizing pulse, transmits pulses of energy at the frequency $f_x$ through the duplexer 60 into space from the antenna 62 which intercepts reflected energy from targets and from clutter such as main lobe ground clutter and side lobe ground clutter. The range gate 92 may effectively eliminate the side lobe clutter signals. The received RF (radio frequency) energy is at a frequency of $f_x + f_{ds}$ where $f_{ds}$ is the doppler shift caused by the movement of the target and the movement, relative to the radar illuminated patch or portion of the earth's surface, of the platform on which the radar is mounted such as an aircraft. The RF signal at the frequency $f_x + f_{ds}$ and a signal at a frequency $f_x + f_o$ from the stable local oscillator 70 are applied to the mixer 88 to apply the signal at the frequency $f_o - f_{ds}$ to the mixer 86. The mixer 68 responds to the signal from the local oscillator 70 and a sample signal from the magnetron transmitter to apply an IF frequency signal, at a phase determined by the phase of the transmitted signal $f_x$, to the phase detectors 74 and 78. The local oscillator 70 functions as the phase reference at RF frequencies. The stable IF reference oscillator 72 at the frequency $f_o$ allows the phase detectors 74 and 78 to accurately detect the phase of the transmitted pulse after conversion to IF frequency. In response to the PRF synchronizing pulse, voltages representing the quadrature phase relations are stored in the box car circuits 80 and 82 during each interpulse period while energy is being returned from objects in space and on the ground.

For converting the IF signal to a coherent signal, the phase correction is applied to the signal at the frequency $f_o - f_{ds}$ to develop the velocity compensated mixed frequency signal on the lead 90 as determined by the VCO 108. Referring also to the phase rotator of FIG. 10, the voltage applied to the center taps of the primary windings 362 and 364 determines the phase position of the summed signal on the lead 85 at any frequency applied to the lead 109. The signals on the leads 81 and 83 are proportional to the cosine and sine of the phase angle of the transmitted energy after conversion to IF frequency and vary the diode balance or conductance to the linear diodes to apply the vector signals to the lead 374. Thus the signal is mixed at the mixer 86 to develop a coherent signal, that is, a signal that is always in phase with the reference oscillator 72 so that signals developed from return energy of different sequential transmitted pulses have a known phase relation.

The coherent signal on the lead 90 may have a frequency $f_1 - \Delta S$ where $\Delta S$ is the relatively small loop correction frequency. The velocity error caused by platform or aircraft motion relative to the patch of the earth's surface illuminated by the main lobe antenna pattern is eliminated by shifting the central line of the clutter spectrum to a selected frequency $f_1$. As is well known in the art, the clutter spectrum of signals repeating at multiples of the PRF may vary over a wide range of frequencies as a function of the platform velocity. As shown in FIGS. 21 and 22, clutter spectral signals may shift in frequency as the platform changes its position relative to the main lobe clutter reflectors which may be a varying ground configuration. The aircraft or platform 602 containing the system in accordance with the invention is flying along a flight path 603 relative to a target 605 which may be considered stationary for a short interval of time and relative to a range gated terrain surface 607. In response to three transmitted pulses, three sequential main lobe patterns 1, 2 and 3 may be formed. Although the target is illuminated during all three time periods, different areas of the terrain 607 are illuminated and the clutter shifts in doppler frequency (not considering the azimuth scanning motion of the antenna). Thus a clutter spectrum 609 of a spectral diagram 611, which may occur in the region of frequency $f_o'$ or $f_o - f_{ds}$, includes clutter returns from lobes 1, 2 and 3 and extends over a relatively wide range of frequency because of the change in clutter doppler frequency. Target signals $T_1$ of repetitive spectral lines 682 and 684 and target signals $T_2$ of repetitive spectral lines 683 and 685 have a relatively narrow spectral width because of the relatively small change in doppler frequency. The clutter spectrum 609 also repeats at the signal 687. The velocity compensation system of the invention translates the clutter signals 609 and 687 in frequency so that the central clutter spectral signal 609 is centered when heterodyned to IF frequency at the frequency $f_1$ as a signal 687 of a spectral diagram 797 representing stationary clutter or effectively representing stationary clutter. The filter 94 is selected with a narrow band centered at the frequency $f_1$ and the discriminator 98 is centered at frequency $f_1$ to maintain the frequency of signal 687 thereat.

As shown in FIG. 23, the clutter filter 94 has a narrow passband 668 and the discriminator 98 has a voltage versus frequency characteristic indicated by a curve 670. It is to be noted that the velocity compensating loop functions to always maintain the central line of the clutter spectrum, that is, the spectral signal insensitive to the PRF, to be maintained at the frequency $f_1$. The loop 95 operates only when the clutter signal has sufficient amplitude to activate the signal activated gate 67. The linear predictor operation when the voltages are established such as by controlling the switch 100, assures that the closed loop 95 will track the central line or the signal 687. If the central line were not tracked, the loop 95 would be required to operate over a relatively wide dynamic range. The clutter spectral signal 687 is then passed through the function circuit 102 which may be essentially a low pass filter. The closed loop correction signal is then applied to the summer 104 and would provide adequate velocity correction except that the clutter signals vary in amplitude and may be temporarily absent when flying over terrain of varying configurations. Thus the closed loop velocity compensation is utilized for second order corrections in accordance with the invention and the linear predictor 30 predicts clutter doppler shift for first order corrections as a function of the systematic phase variations due to antenna line-of-sight velocity to stationary clutter reflectors. In the absence of clutter, the loop 95 is inactive in response to the signal actuated gate 67 and the open loop linear predictor maintains the clutter spectrum at the proper frequencies. The velocity vectors $V_I$, $V_J$ and $V_K$ in space coordinates may be derived from the doppler or inertial navigation system 32. Also, the velocity vectors in space coordinates may be derived from a stable platform and a computer or from systems utilizing analog or digital techniques to compute the velocity vectors. As explained relative to FIGS. 11 and 13, the line-of-sight velocity signal $V_{LOS}$ may be developed from resolvers responding to the velocity vectors in aircraft coordinates and to the antenna angles $\eta$ and $\xi$ relative to the aircraft. The summer 104 thus receives a continuous predicted correction signal for controlling the VCO 108 which operates at a frequency of $f_o - f_1 - f_{ds} +$ to $\Delta S$. The signal on the lead 109 at this frequency is applied to the mixer 86 (after a phase correction) to maintain the velocity compensated signal on the lead 90 with the clutter spectrum signal 687 (FIG. 22) centered at frequency $f_1$. It is to be noted that if other types of coherent transmitters and receivers are utilized, the lead 109 may be directly coupled to the mixer 86 within the scope of the invention. As the clutter signal is translated to the frequency $f_1$, the target signals are translated over a relatively wide frequency range as shown by spectral signals 689 and 681 for target $T_1$ and by spectral signals 693 and 685 for target $T_2$. The signal designations 1, 2 and 3 of the signal 689 correspond to the positions of the lobes in FIG. 21.

The signal on the lead 90 is mixed in the mixer 120 to a video frequency in response to the balanced modulator or mixer 126 in turn responsive to the VCO 124 operating at the frequency $f_1$. The mixer 120 functions as a synchronous detector in response to the reference frequency of the VCO 124 offset by a frequency of one-half PRF to provide spectral folding at one-half PRF of the signal on the lead 90. For accurately tracking the frequency of the signal, the phase detector 130 responds to the signal on the lead 96 and the signal developed by the VCO 124 to apply a control signal through the function circuit 132 which operates as a low pass filter and amplifier to maintain the synchronous frequency $f_1$ at the output of the VCO 124, that is, the VCO 124 is locked in phase with the signal on the lead 90. As the VCO 124 is centered at the frequency $f_1$, the synchronous detection operation continues in the absence of clutter signals on the lead 96 such as when the gate 67 is open. The balanced modulator 126 may be a conventional circuit including a transformer with the signal from the VCO 124 applied to the primary winding and the alternately high and low signal applied from the flip flop 127 to the center tap of the secondary winding. Oppositely poled diodes are connected between the ends of the secondary winding to an output lead and a parallel inductor and capacitor to ground. The modulator 126 provides a frequency offset (either a decrease or an increase) to the signal applied to the mixer 120. As a result of changing the modulation with each PRF synchronizing pulse, the clutter signals 687 and 697 of FIG. 22 are translated to a frequency of ½ PRF when the spectrum folds as shown by a clutter signal 699 of a spectral diagram 703. The spectrum is folded in the mixer 120 at a folding line of frequency $f_1 + ½$ PRF of the diagram 797. As frequency is equal to the derivative of phase angle with respect to time, a frequency or PRF of 2 KC would develop a 360° phase change in a period of 1/2000 seconds. If the frequency is 1 KC, the signal shifts in phase by 180 degrees during a time interval of 1/2000 seconds. As 1 KC is equal to ½ PRF and if the phase is changed by 180 degrees in a PRF interval, the signal such as the clutter signal is frequency translated ½ PRF to the frequency ½ PRF as the spectrum of the diagram 797 folds at a ½ PRF point. Because the VCO 124 develops a reference signal that is synchronous in phase with the signal on the leas 90, the video signal is folded to DC. Thus, in the illustrated system, ½ PRF corresponds to a 180° phase change or phase reversal in a PRF time interval by the flip flop 127 which causes a ½ PRF offset (increase or decrease in frequency) of the signal developed by the modulator 126 and of the clutter signal because the VCO 124 is maintained phase locked at the frequency $f_1$ (or $f_1 - \Delta S$) of the clutter signal on the lead 90. Also, other PRF frequency offsets in the modulator 126 may be provided in accordance with the principles of the invention such as a ¼ PRF offset (with folding to DC of the spectral diagram 797 at a ¼ PRF point) by changing the phase 90° every PRF or frequency interval at the modulator 126 or a ⅛ PRF offset (with folding to DC of the spectral diagram 797 at a ⅛ PRF point) by changing the phase 45° every PRF or frequency interval at the modulator 126. Conventional counter type circuits may be utilized in place of the flip flop 127 for PRF offsets such as ¼ and ⅛.

The target signals 701 and 702 are thus established in a spectral region close to DC so as to be well within the frequency limitations of storage devices such as the storage tubes 136 and 138. The target $T_1$ of the spectral signal 701, which is derived from the spectral signal 689, is folded into the interval from DC to ½ PRF and the target $T_2$ of a signal 702 is frequency shifted while in the ½ PRF interval. The dotted target signal $T_2$ is shown to indicate that a target signal in any position will appear in the ½ PRF interval of the spectral diagram 703. It is to be noted that the direction of frequency change for an increasing doppler frequency is reversed when the target $T_1$ is folded into the ½ PRF interval as indicated by the direction of the arrows. By establishing the clutter signal at a fixed frequency, any target signal may be detected within the DC to one-half PRF range of the folded spectrum.

Referring to FIG. 24, a curve 707 shows the percent response of a typical storage tube to the frequency of the applied signals. For example, in the illustrated system, the ½ PRF frequency may be at $F_s$ spatial cycles and in a region of relatively low tube response. Thus, the central line of the spectral clutter signal centered at ½ PRF is attenuated in the storage tube without affecting the target signal because of the ½ PRF modulation in accordance with the invention. Similarly signals at frequencies larger than ½ PRF are substantially rejected in the tube storage operation. It is to be noted that the system may operate with other types of storage devices or without storage and the principles of the invention are equally applicable thereto.

Referring now to FIGS. 4, 5, 25, 26 and 27, the clutter referenced video signal is applied on the lead 122 to the write amplifier and bias circuits 164 and 164a at the storage tubes 136 and 138. As may be seen in FIG. 26, writing is performed during $W_1$ horizontal sweep and $W_2$ horizontal sweep times on respective tubes 136 and 138 in response to pulses of the waveforms 717 and 719. The write horizontal sweep generator 180 responds to the $W_1$ horizontal sweep gate signal of the waveform 717 to apply a horizontal sweep signal to the horizontal deflection circuit 184 which controls the coil 154. The $W_1$ period of the waveform 690 may have a duration of 140 ms (milliseconds), for example, in the illustrated system. Also in the illustrated system the $R_1$, $E_1$ and $P_1$ pulses of respective waveforms 694, 703 and 708 may have respective durations of 20 ms, 20 ms and 40 ms. During the horizontal sweep, the signal from each range sweep is recorded in a different vertical line on the storage screen 142 as shown by a diagram 719 of FIG. 25. The horizontal parameter of the diagrams 708 and 719 may be $\dot{\eta}_s$ ($\Delta T$) where $\dot{\eta}_s$ is $\delta \eta_s/\delta_t$ and $\Delta T$ is the time for scanning one antenna scan sector (frame) in azimuth. The write vertical sweep generator 192 responds to the $W_1$ vertical sweep gate signal of the waveform 701 developed by the single shot circuit 336 of FIG. 9 to control the vertical deflection circuit 194 and define the write vertical sweep during each range sweep or PRF interval. Pulses of the waveform 701 are developed in response to PRF pulses during $W_1$ time, the pulses having a duration of 370 microseconds, for example, when each D period is 10 milliseconds. For example, 280 vertical sweep signals may be developed by the generator 192 for recording data over a selected azimuth scan sector of approximately 12.6° when the antenna scans at a rate of 90° per second. It is to be noted that during the portion of the $W_1$ and $W_2$ periods which overlap in time, the same data is recorded in both storage tubes. Thus overlap in time results in improved detection of a moving target that may be split or divided, that is, positioned at the edge of a scan sector as defined by the last portion of the write raster of one tube. Sweep pulse generators that develop a sweep during each of a plurality of gated time intervals are well known in the art. During writing, the tube previously being erased and primed, the dynamic focus amplifier 174 responds to the horizontal dynamic focus generator 178 controlled by the $W_1$ horizontal DF gate signal of the waveform 697 developed by the flip flop 330. Also, the write vertical deflection generator 188 responds to the $W_1$ vertical deflection gate signal of the waveform 703 developed by the single shot circuit 338 (FIG. 9) to apply a vertical focus signal to the amplifier 186. The $W_1$ vertical DF gate signal of the waveform 703 occurs during the $W_1$ period in response to each PRF pulse and each DF pulse may have a duration of 185 microseconds when the D period is 10 milliseconds, for example. The horizontal and vertical focus signals as well as the static focus voltage from the supply 172, provide a static and dynamic focus for magnetically controlling the beam, as is well known in the art.

Also during writing, the coding circuit 168 responds to the $W_1$ signal to control and establish the bias potential of the amplifier 164 prior to generation of the sweep voltages. The unblanking pulse of the waveform 705 also controls the coding circuit 168 during beam flyback times while writing as well as during reading, erasing and prime operations. The decelerator potential gates 208 respond to the signal $W_1$ to gate the required potential to the decelerator grid 144 prior to writing into the tube 136. Before completion of writing into the tube 136, the $W_2$ pulse of the waveform 692 and the $W_2$ horizontal sweep pulse of the waveform 719 are developed to perform a similar writing operation on the tube 138, the same data being recorded on both tubes during times $D_{11}$, $D_{12}$ and $D_{13}$.

At the completion of writing on tube 136, the reading operation is performed on that tube in response to an $R_1$ pulse of a waveform 694. It is to be noted that during writing in tube 136, information is being read from the tube 138 in response to the read pulse $R_2$ of a waveform 696. Reading is performed by the triangular or jizzle signal of the waveform 700 (FIG. 28) controlling the horizontal deflection and a vertical sweep for $R_1$, $E_1$ and $P_1$ signal of the waveform 698 controlling the vertical deflection in the range dimension as shown by a screen surface 708 in FIG. 25. Thus signals are read from each range interval over the data from a plurality of range sweeps of an azimuth sector to provide highly reliable target signal indication. Reading the stored data twice may be performed in 20 milliseconds in the illustrated system. The vertical sweep generator 193 responds to an inverted write signal $\overline{W}_1$ and to the $R_1$, $E_1$ and $P_1$ vertical sweep gate signal of the waveform 698 of FIG. 26 to develop a vertical deflection sweep for 9 milliseconds in the illustrated system. The horizontal sweep generator 200 responds to $\overline{W}_1$ and to the triangular sweep gate signal $F_2(A)$ of a waveform 727 of FIG. 28 to develop the triangular signal of a waveform 700 changing slope each 10 microseconds, for example. It is to be noted that the generator 200 may include an integrator being alternately charged and discharged in response to the pulses $F_2(A)$ to form the triangular sweep signals. The signal $F_2(A)$ may be formed at the output of the A counter 314 of FIG. 7. Thus, the tube is alternately swept in opposite directions throughout all range intervals as indicated by the surface 708 of FIG. 25. During $R_1$ time as shown by the waveform 694, the tube is swept twice in the vertical direction as controlled by the $R_1$, $E_1$ and $P_1$ vertical sweep signal of the waveform 698. During reading, the decelerating potential gates 208 control the decelerator potential and the potential switches 214 control the storage screen potential. The horizontal sweep generator 201 controls the horizontal dynamic focus in response to the signal $F_1(A)$ of a waveform 712 as developed in the A counter 314 of FIG. 7. The $R_1$ pulse of the waveform 694 is applied to the gated read amplifier 220 to pass the modulation sensed on the collector 140 during reading, which signal is applied to the lead 222 with the clutter signal 699 of FIG. 22 centered at 10 MC in the illustrated system, which is equivalent to ½ PRF after frequency conversion in the storage tubes.

After the reading operation in the tube 136 the erase operation is performed in response to an $E_1$ erase pulse of a waveform 703, and the vertical sweep signal for $R_1$, $E_1$ and $P_1$ of the waveform 698. Erasing is performed by writing a DC signal into the tube to normalize the storage element at full modulation level. The $E_1$ pulse is applied to the coding circuit 168 and a sufficiently high bias potential is applied to the intensity grid 148. The horizontal sweep generator 200 responds to the $\overline{W}_1$ pulse or the absence of writing and to the signal $F_2(A)$ of the waveform 727 (FIG. 25) to apply the jizzle or triangular voltage of the waveform 700 to the horizontal deflection coil 154 during the erase period. At the same time, the vertical deflection generator 193 responds to the signal $\overline{W}_1$ and to the $R_1$, $E_1$ and $P_1$ vertical deflection signal of the waveform 698 (FIG. 26) for applying a vertical sweep signal to the vertical deflection coil 152. Focusing during the erase period is controlled by the vertical deflection generator 189 responding to the signal $\overline{W}_1$ and the $R_1$, $E_1$ and $P_1$ vertical deflection signal of a waveform 710 (FIG. 26). The focus is also controlled by the horizontal sweep generator 201 responding to $\overline{W}_1$ and to the signal $F_1(A)$ of a waveform 712 (FIG. 28). The decelerating potential gates 208 and the potential switches 214 are controlled by the $E_1$ pulse to apply the required bias to the respective collector and storage screens just prior to starting of the sweep voltages.

Priming is accomplished by uniformly charging the storage surface by reducing the screen voltage below the critical potential and scanning the raster during a $P_1$ pulse of the waveform 708. The coding circuit 168 is controlled by the pulse $P_1$ and the decelerator potential gates 208 and the potential switches 214 are also gates in response to the pulse $P_1$. The horizontal sweep generator 200 responds to the signals $\overline{W}_1$ and $F_2(A)$ to control the horizontal deflection circuit 184 to apply a horizontal sweep signal of the waveform 700 (FIG. 28) to the coil 154. The vertical sweep generator 193 responds to the signal $\overline{W}_1$ and to the $R_1$, $E_1$ and $P_1$ vertical sweep gate of the waveform 698 to control the vertical deflection coil 152. The vertical dynamic focus generator 189 responds to $\overline{W}_1$ and the vertical deflection signal of the waveform 710 to apply a vertical dynamic focus signal to the amplifier 174. The horizontal dynamic focus generator 201 responds to $\overline{W}_1$ and the signal $F_1(A)$ to apply a horizontal dynamic focus signal to the amplifier 174. After completion of a prime operation, the signal $W_1$ is repeated to control writing on the tube 136. The operation of the tube 138 of FIG. 5 is similar to that described for FIG. 4, occurring during times defined by the $W_2$ pulse of the waveform 692, the $R_2$ pulse of the waveform 696, the $E_2$ pulse of a waveform 714 and a $P_2$ pulse of a waveform 716.

The signals read from the tubes 136 and 138 are applied from the leads 222 and 222a to the lead 231 of FIG. 6 and to the plurality of channels of the clutter filter 230, one of which is energized during each $R_1$ or $R_2$ pulse. The $\dot{V}_{LOS}$ signal which is the partial of $V_g$ over the partial of azimuth angle $\eta_s$ is continually developed and applied through the lead 117 to the A to D converter 248 to the register 250 in response to signals $S_1$ or $S_2$ of respective waveforms 741 and 743. It is to be noted that the signal $\dot{V}_{LOS}$ is also a function of the elevation angle $\xi_s$ which is a constant in the illustrated azimuth scan system. A clock pulse $RC_1$ or $RC_2$ of respective waveforms 747 and 749 may also be applied to the flip flops of the register 250. The signals $S_1$ and $S_2$ occur substantially at the center of the $W_1$ or $W_2$ write periods so a sample is available during reading. The $\dot{V}_{LOS}$ information is thus sampled at the center of the time period of each azimuth scan sector although either more frequent or less frequent sample periods may be utilized within the scope of the invention. The decoded signals are passed through the mask logic circuit 256 to apply a pulse to one of the 16 leads such as 233 to energize a gate such as 232. Each of the filters 238 to 242 has a passband characteristic that becomes progressively smaller by filter parameter selection as is well known in the art. The clutter signal has the narrowest width when the antenna is pointing along the ground velocity vector of the aircraft and becomes increasingly wide in frequency as the scan angle $\eta_s$ increases. At a constant velocity, as the value of $\dot{V}_{LOS}$ increases from scan sector to scan sector, filters progressing from 242 to 238 are selected and as the angle $\eta_s$ increases, filters 238 to 242 are progressively selected. Both positive and negative values of $M_s$ may provide the same values in the illustrated system. Thus the digital value of $\dot{V}_{LOS}$ is stored when the video signal is stored in one tube and when the data is read from that tube the stored $\dot{V}_{LOS}$ is utilized to energize a desired clutter filter. This operation provides complete elimination of the clutter signal while passing the maximum spectral width between DC and ½ PRF for detection of a target signal. The clutter signal 699 of FIG. 22 is removed in the filter such as 238 to pass a target signal 777 of a spectral diagram 779 to the lead 264. The percent response at ½ PRF as shown by the curve 807 (FIG. 24) is relatively low in the region of the clutter signal of the diagram 703 of FIG. 22. Thus signals at clutter frequencies and higher than ½ PRF in the diagram 779 are greatly attenuated by the response of the tubes. The target signal is maintained in the region of maximum frequency response in the system in accordance with the invention.

After removal of the clutter spectrum, the video signal is applied to the balanced mixer 266 for correcting the target spectral signal. As shown in FIG. 22, the target signals such as 701 is frequency shifted over a relatively wide spectral region as a result of the velocity compensation and would be unreliably detected because of the low output signal to RMS (root mean square) noise ratio. The shifted target signals of the diagram 703 may have a width of 500 cycles per second, for example. The target signal is thus translated in frequency an amount corresponding to the motion compensation of the corresponding signal applied to the mixer 266 at each instant of time. When the data is transferred to the register 250 during each writing interval in response to signals $S_1$ or $S_2$, the desired impedance is selected in the step attenuator circuit 270. In response to the triangular signal of the waveform 700 (FIG. 28), the correlation 268 is swept first with one frequency variation slope at each range interval during the first reading from the tube to develop the frequency variation of a waveform 730. During the next reading from the tube, a signal 180° out of phase from the waveform 700 develops the frequency variation of a waveform 732 to sweep the data from each range interval with an inverted frequency variation slope, both with the same setting of the step attenuator 270 from the decoder 254. It is to be noted that by providing a correction with a swept oscillator in response to a slope setting during each azimuth scan sector, for example, the frequency correction approaches a continuous sample type of operation. Thus during each reading period, the signal is translated in both directions of increasing and decreasing frequency, one frequency translation being in the correct direction for narrowing the target signal. The video signal is applied from the amplifier 280 to the doppler filter bank 286 where the doppler filter receives the target signal while it is being translated to a narrow spectral width and to a wide spectral width. During the incorrect signal translation, the signal power to noise ratio is relatively low so that essentially no signal is passed to the detectors such as 288 and 290. However, during the time of the correct frequency translation, the spectrally narrow target signal has a large signal to noise ratio and one of the detectors applies a signal to the OR gate 290. Because of the correction of the spectral width, the doppler filters such as 282 and 284 may have desirable narrow bands. The fixed threshold detector circuit 292 passes signals that exceed the threshold to the AND gate 294 which during the blanking pulse period, applies a detected moving target signal to the display device 296. The detected signal may be applied to the intensity grid of a cathode ray tube included in the display device 296. In a range-azimuth display, the target indications such as 740 and 742 have a width determined by the continuance in each range gate of a target signal during reading at each range interval. The analog value of the antenna azimuth angle $\eta_s$ is applied to the A to D converter 303 and to the register 304 during each writing period $W_1$ or $W_2$ as defined by the signals $S_1$ or $S_2$. The data is then applied through the D to A converter 307 to a horizontal deflection generator (not shown) of the display device 296 to control the horizontal or azimuth position. It is to be noted that the timing signals and the detected video signals may be utilized in other types of devices such as a correlation computer.

As an illustration of the operation of the system in accordance with the invention, the frequency of $f_x$ may be 9200 MC, the local oscillator 70 may operate at 9230 MC, $f_o$ may be equal to 30 MC, $f_1$ may be equal to 13.5 MC, $f_{ds}$ may have a range of 10 to 30 KC and $(f_o - f_1)$ may be equal to 16.5 MC. The signals on the lead 122 may have a range of DC to 2 MC (for ½ microsecond pulses) when the system is operating at a PRF of 2 KC so that the ½ PRF point has a frequency of 1 MC. The signal read from the processor on the line 222 may have a frequency range of 0 to 14 MC (corresponding to ½ PRF) and the triangular waveform may have a frequency of 50 KC. As the data is recorded on the tube in 140 microseconds and each range interval is read in 10 microseconds, the storage arrangement provides a frequency multiplication factor of 14,000. Thus the signal of the waveform 703 (FIG. 22) is effectively multiplied by a constant and the ½ PRF frequency is 14 MC. For the doppler filter bank, 28 filters each of 500 KC bandwidth and at 500 KC centers may be utilized. The target spread of the waveform 703 resulting from the velocity compensation may be in the range of 2.8 MC, for example. A similar frequency region would be encompassed by the clutter spectrum if it were not for the velocity compensation in accordance with the invention, which would result in additional frequency eclipsing of the target signal.

The system in accordance with the invention thus operates in a coherent fashion either with a conventional coherent transmitter and receiver or by converting an existing noncoherent system to a coherent system. Although the system operates with highly reliable operation in low or medium PRF radar systems, the principles of the invention are applicable to all types of pulse rates. The principles of the invention are applicable to systems operating with a stable platform, with an inertial guidance system or with a doppler guidance system as well as other velocity determining systems. Although the system of the invention is especially applicable for detecting targets during a search operation, the principles of the invention are applicable to other types of operations. The system of the invention may be operated with multiple PRF selection to overcome the problems of frequency eclipsing of the target signals by the spectral clutter signal as is well known in the art. A velocity compensation feature in accordance with the principles of the invention effectively maintains the clutter signals stationary or eliminates the mean doppler effect due to platform motion. The return energy from any one target or object is essentially at a constant doppler frequency during one azimuth sweep while the clutter continually changes in doppler frequency. The velocity compensation maintains the clutter spectrum corresponding to the lineof-sight axis at a constant doppler frequency in response to platform velocity and azimuth scan angle. During other azimuth sweeps the target may have a different doppler frequency but is essentially constant during that scan while the clutter signal again continually changes in doppler frequency. As the clutter spectrum is always maintained at a constant doppler frequency such as to cancel the effects of the platform motion, a reliable processing and detection operation is provided. This velocity compensator operates reliably during the absence of clutter signals by a first order linear prediction correction. The IF signal is modulated to a clutter referenced video signal with the clutter shifted to a frequency of ½ PRF so that the target frequencies are within the frequency limitations of the storage device. An improved storage arrangement such as two tubes is utilized for alternately storing the video signal in range and azimuth. The video signal is then read over each range interval for a plurality of radar sweeps so that the width of the target may be utilized for reliable detection. After reading the stored signal at a selected rate, the signal is passed through a gated clutter filter so that the clutter is removed with a rejection band corresponding to the width of the filter, as a function of the aircraft velocity and the angle of the antenna line-of-sight. After removal of the clutter, the target signal is frequency translated to the original narrow spectral width prior to the velocity compensation. The matched target signal is then passed through doppler filters and detectors for detecting a moving target and to a display device, for example.

Thus, there has been described an improved radar system that reliably detects moving targets over rough terrain or other types of surfaces when operating over a wide range of pulse repetition frequencies. The system may operate reliably at a low PRF which is desirable because the range information is unambiguous. The system is operable with conventional noncoherent radar systems by changing the phase to correspond to that of a stable oscillator or with coherent on receive radar systems.

What is claimed is:

1. A coherent radar system operable with a scanning antenna at a selected pulse repetition frequency for responding to signals from moving objects and clutter signals from stationary reflectors comprising:

first means for providing a continuously variable frequency offset to develop a signal with the clutter signals at a constant mean doppler frequency independent of scan angle, filter means for rejecting the clutter signals, and second means for providing a continuously variable frequency offset for removing the continuously variable frequency offset of the moving object signals developed by said first means.

2. A processing system for a coherent radar system developing coherent signals having target signals and clutter signals both at a variable doppler frequency comprising:

means for providing a variable frequency offset for establishing said clutter signals substantially at a constant mean doppler frequency and imparting a variable frequency offset to said target signals, means for rejecting the clutter signals, means for removing the variable frequency offset from the target signals, and means for detecting said target signals.

3. A doppler radar system comprising:

noncoherent transmitter and receiver means for transmitting and receiving a radar signal at a predetermined PRF, said radar signals including target signals and clutter signals, means coupled to said transmitter and receiver means for converting the received radar signals into coherent signals, means for modulating said coherent signals to a frequency with clutter signals at a frequency of one-half PRF, scan storage means for storing the modulated signals, means for reading the signals stored on said storage means, means for rejecting said clutter signals, and doppler filter means for detecting the presence of a moving target.

4. A doppler radar system comprising:

noncoherent transmitter and receiver means for transmitting and receiving a radar signal at a predetermined PRF, said radar signals including target signals and clutter signals, means coupled to said transmitter and receiver means for converting the received radar signals into coherent signals, means responsive to said coherent signals for developing a first signal with a plurality of spectral clutter signals at multiples of the PRF interval and with a selected spectral clutter signal at a reference frequency, means for modulating said first signals to a second signal with the selected clutter signal at a frequency of one-half PRF, scan storage means for storing said first signals, means for reading the signals stored on said storage means, means for rejecting said clutter signals, and doppler filter means for detecting the presence of a moving target.

5. A doppler radar system comprising:

noncoherent transmitter and receiver means for transmitting pulses of energy at a predetermined PRF and receiving radar signals, said radar signals including target signals and clutter signals, means coupled to said transmitter and receiver means for converting the received radar signals into coherent first intermediate frequency signals having clutter spectral signals repetitive at PRF intervals, means for modulating said coherent signals to a video signal with selected clutter spectral signals at a frequency of one-half PRF, scan storage means for storing the video signals, means for reading the signals stored on said storage means to develop a second intermediate frequency signal being at frequencies of a predetermined multiple of said video signal, means for rejecting said selected clutter spectral signals, and doppler filter means responsive to said second intermediate frequency signal for detecting the presence of a moving target.

6. A coherent radar system operable from a moving platform, having a scanning antenna and developing a coherent signal including clutter signals from stationary reflectors and target signals from moving targets comprising:

velocity compensation means for providing a continuously variable frequency offset to develop a signal with the clutter signals at a constant mean doppler frequency independent of scan angle and producing a continuously variable frequency modulation to said target signals, filter means for rejecting the clutter signals at a predetermined multiple of the constant doppler frequency, means for providing a continuously variable frequency offset to the target signal after removal of the clutter signal to remove said frequency modulation, narrow band doppler filters responsive to the target signal, and detecting means coupled to said narrow band filters for detecting a target signal representative of a moving target.

7. A coherent radar system operable with a scanning antenna at a selected pulse repetition frequency for responding to signals from moving targets and clutter signals from stationary reflectors comprising:

first means for providing a continuously variable frequency offset to develop a first signal with the clutter spectral signals at a constant doppler frequency independent of scan angle, means responsive to said first means for developing a second signal with selected clutter spectral signals at a selected multiple of the pulse repetition frequency, storage means responsive to said second signal for developing a third signal being multiplied in frequency by a predetermined constant, filter means for rejecting the clutter spectral signals of said third signal, and means for providing a continuously variable frequency offset to said third signal for removing the continuously variable frequency offset of the target signals in said third signal.

8. A variable width clutter filter operable in a radar system being on a moving platform and having an azimuth scanning antenna with an antenna line-of-sight axis, said radar system developing a signal having clutter signals centered at a predetermined frequency and of varying spectral widths comprising:
   first means for developing velocity vector signals representative of the velocity of the moving platform,
   second means for developing antenna scan angle signals,
   process control means responsive to said first and second means for developing a signal representative of the rate of change of the platform velocity along the antenna line-of-sight axis,
   variable width filter means coupled to said radar system for responding to the signal developed thereby and having a variable rejection band width,
   and decoding means coupled between said process control means and said variable width filter means for controlling the rejection band width to correspond to the width of said clutter signal.

9. A variable width clutter filter operable in a radar system being on a platform moving in a selected direction and having an azimuth scanning antenna with an antenna line-of-sight axis, said radar system developing a signal having clutter spectral signals centered at a predetermined frequency and of varying spectral widths comprising:
   process control means for developing a control signal as a function of the platform velocity and angle of the antenna line-of-sight axis relative to direction of movement of the platform,
   variable width filter means coupled to said radar system for responding to the signal developed thereby and having a variable rejection band width,
   and means coupled between said process control means and said variable width filter means for controlling the rejection band width to substantially reject said clutter spectral signal.

10. A doppler processing system for a radar system operable on a moving platform and having an antenna with an axis scanning in azimuth through a selected angle, said radar system developing a video signal having target signals in a target spectral region and having spectral clutter signals centered at a predetermined frequency and of varying spectral width comprising:
    first means for developing velocity vector signals representative of the velocity of the moving platform,
    second means for developing antenna scan angle signals,
    process control means responsive to said first and second means for developing a signal representative of the rate of change of the aircraft velocity along the axis of the antenna,
    variable filter means coupled to the radar means for responding to the video signal and having a variable width pass band and rejection band to reject the clutter signals,
    decoding means coupled between said process control means and said variable clutter filter means for controlling the rejection band width to pass a maximum target spectral region while rejecting said clutter signals,
    and doppler filter means coupled to said clutter filter means.

11. A coherent radar system operable with a scanning antenna and from a moving platform and at a selected pulse repetition frequency and receiving clutter signals and moving target signals comprising:
    first means responsive to the velocity of said platform and the scan angle of said antenna for providing a continuously variable frequency offset to said radar signal to develop a first signal with the clutter signals at a constant doppler frequency and the target signal having a continually varying frequency offset,
    second means for storing and reading said first signals to develop a second signal,
    third means for rejecting the clutter signals of said second signal to develop a third signal,
    and fourth means responsive to the velocity of said platform and said scan angle for applying a continuously variable frequency offset to said third signal to remove the continuously variable offset resulting from said first means.

12. A signal processing system operable with a scanning coherent radar system operable from a moving platform to develop target signals and clutter signals comprising:
    motion compensation means for developing signals referenced to a constant doppler frequency by modulating the clutter signals and the target signals,
    control means for controlling said motion compensation means as a function of the platform velocity and the scanning position,
    clutter rejection means coupled to said motion compensation means for removing clutter signals and passing target signals,
    and mixing means coupled to said clutter rejection means and to said control means for frequency modulating the target signals to substantially remove the modulation developed by said motion compensation means.

13. A radar system operable from a moving platform having a velocity and having an antenna scanning through predetermined azimuth scan angles for detecting moving targets in the presence of stationary reflectors comprising:
    antenna means for scanning in azimuth,
    transmitting and receiving means for transmitting pulses of energy at a predetermined pulse repetition frequency to moving targets and stationary reflectors and receiving coherent return signals reflected from said moving targets and reflectors as respective target signals and clutter signals,
    velocity compensating means for applying a continuously variable offset frequency to the coherent signal to maintain the clutter signals at fixed frequencies as a function of the velocity of the platform and the azimuth scan angle and to apply a continually variable frequency offset to said target signal,
    modulating means coupled to said velocity compensating means to modulate the velocity compensated signal to a video signal with the clutter signal at the frequency of one-half of the pulse repetition frequency,
    storage means responsive to said video signal to develop a frequency multiplied video signal,
    clutter rejection means coupled to said storage means for rejecting the clutter signals as a function of the velocity of the platform and said azimuth scan angle, mixing means coupled to said clutter rejection means for removing the continually variable frequency offset from the target signal of the frequency multiplied video signal as a function of the velocity of the platform and said scan angle, and doppler detecting means coupled to said mixing means for detecting said target signals.

14. A coherent radar system operable on a moving platform responsive to coherent signals received from stationary clutter reflectors and from moving targets in response to pulses of energy transmitted at a predetermined PRF while scanning over a predetermined azimuth pattern comprising:

means for converting the coherent signals to IF signals, having a clutter spectrum and a target spectrum as a function of the PRF, velocity compensation means responsive to said IF signals, to the velocity of said platform and the scan angle to continually frequency translate the IF signals so the central clutter signal of the clutter spectrum is at a predetermined constant frequency to effectively eliminate the doppler shift caused by motion of said platform, said target spectrum being continually frequency modulated, modulating means coupled to said motion compensation means for modulating said IF signal to a video signal with the central clutter signal at a frequency of one-half PRF, storage means for recording said video signal developed by said modulating means and for reading said signals so that said central clutter signal is at a frequency of a selected multiple of said one-half PRF, variable clutter filter means coupled to said recording means for rejecting said clutter signals at the selected multiple of said one-half PRF, as a function of the platform velocity and the antenna scan angle, mixing means coupled to said clutter filter means for substantially removing the frequency modulation from the target spectral signal to develop a narrow spectral width as a function of the aircraft velocity and antenna scan angle, and doppler detecting means coupled to said mixing means for detecting a moving target signal.

15. A doppler processing system for a radar system operable on a moving platform and having an antenna with a line-of-sight axis scanning in azimuth through a selected angle, said radar system developing a first signal having a target signal in a target spectral region and having a clutter signal centered at a predetermined frequency and of a varying spectral width comprising:

first means for developing velocity vector signals representative of the velocity of the moving platform, second means for developing antenna scan angle signals, process control means responsive to said first and second means for developing a signal representative of the rate of change of the aircraft velocity along the antenna line-of-sight, storage means coupled to said radar system for multiplying the frequency of said first signal to a second signal of higher frequency, variable width filter means coupled to said radar system for responding to the signal developed thereby and having a variable rejection band width, decoding means coupled between said process control means and said variable width filter means for controlling the rejection band width as a function of the width of said clutter signal, narrow band doppler filter means coupled to said variable filter means for responding to the target signals, and detecting means coupled to said doppler filter means for detecting said target signals.

16. A coherent radar system operable from a moving platform for detecting the presence of a moving target in the presence of clutter of variable frequency comprising:

antenna means coupled to said platform for scanning over a predetermined pattern, noncoherent transmitter and receiver means coupled to said antenna means and operable at a selected pulse repetition frequency for transmitting pulses of energy and receiving energy reflected from targets and clutter reflectors, coherent translating means coupled to said noncoherent transmitter and receiver means for converting the received energy to a coherent signal, velocity compensation means coupled to said coherent translating means for continually frequency shifting a selected clutter spectral signal to a predetermined frequency and for continually frequency shifting target signals, modulating means coupled to said velocity compensation means for developing a video signal with the clutter spectral signal at one-half pulse repetition frequency, storage means for recording said video signal, reading means for reading the stored video signal, variable width filter means for rejecting said clutter signals with a rejection band being a function of the platform velocity and the antenna scan angle, mixing means coupled to said filter means for continually frequency shifting the target signal to a relatively narrow spectral width, and doppler detecting means coupled to said mixing means detecting the presence of said target signal.

17. A doppler radar system operable from a moving platform for detecting moving targets adjacent to stationary clutter reflectors comprising:

noncoherent transmitter and receiver means including an antenna for transmitting signals of a selected pulse repetition frequency and at variable scan angles receiving target signals and clutter signals, phase shifting means coupled to said transmitter and receiver means for converting the received signals to coherent signals, first means for providing a continuously variable frequency offset to the coherent signal as a function of platform velocity and scan angle to develop a signal with the clutter signals at constant predetermined frequencies, second means responsive to the signal developed by said first means for developing a signal having a folded spectrum with a selected clutter spectral signal at a frequency of one-half the pulse repetition frequency, third means for recording and reading the signals developed by said second means to develop a signal at a predetermined frequency multiple of the recorded signal, fourth means for rejecting the clutter signals from the signal developed by said third means with a variable width rejection band as a function of the platform velocity and the antenna scan angle, fifth means for providing a continuously variable frequency offset to the signal developed by said fourth means, to remove the frequency offset of the target signal provided by said first means, a plurality of narrow band doppler filters responsive to the signal developed by said fifth means, and detecting means responsive to the signals passed through said plurality of narrow band doppler filters for detecting a target signal.

18. A coherent radar system operable from a moving platform for detecting moving targets in the region of stationary reflectors and operable with a predetermined pulse repetition frequency comprising:

antenna scanning means, means responsive to said antenna means for developing a first signal including a clutter spectrum and a target spectrum, compensating means for providing a continually variable frequency offset to said first signal as a function of the velocity of the platform and the scan angle of said antenna means to develop a second signal with said clutter spectrum established at a constant frequency and to continuously offset the target spectrum in frequency, modulating means for developing a third signal with the target and clutter spectrum folded and with the target spectrum at selected multiples of the pulse repetition frequency, scan conversion means for responding to that third signal to develop a fourth signal with the pulse repetition frequency being multiplied by a predetermined value, variable width clutter rejection means for passing a selected portion of the target spectrum as a fifth signal with the rejection width being a function of the velocity of the platform and the scan angle of the antenna means, mixing means for responding to said fifth signal for developing a sixth signal with the selected portion of the target spectrum being continuously frequency offset as a function of the velocity of the platform and the scan angle of said antenna means to remove the corresponding frequency offset developed by said compensating means, and doppler detecting means for detecting the target signal in said selected portion of the spectrum.

19. A processor for a doppler radar system operable on a moving platform and having an antenna with a line-of-sight axis scanning in azimuth through a selected angle, said radar system transmitting pulses of energy and receiving energy from moving targets and from stationary reflectors during the interpulse period over a predetermined range interval comprising:

means responsive to said radar system for developing a video signal having a clutter signal centered at a predetermined frequency and having a varying spectral width, storage means for recording the first signal in a range dimension during each interpulse period over a selected number of interpulse periods, extending in an azimuth dimension, reading means coupled to said storage means for reading the first signals in said azimuth dimension stored for said selected number of interpulse periods at each of a plurality of range intervals to develop a range gated second signal having the clutter signal centered at a constant multiple of the predetermined frequency of the clutter signal of said first signal, first means for developing velocity vector signals representative of the velocity of the moving platform, second means for developing antenna scan angle signals, process control means responsive to said first and second means for developing a signal representative of the rate of change of the aircraft velocity along said line-of-sight axis, variable width filter means coupled to said reading means for responding to said second signal and having a variable rejection band width, decoding means coupled between said process control means and said variable width filter means for controlling said rejection band width as a function of the width of said clutter signal, a plurality of narrow band doppler filters operable in common at each range interval read from said storage means, and detecting means coupled to said plurality of doppler filters for detecting the target signals.

20. A processor for a doppler radar system operable on a moving platform and having an antenna with a line-of-sight axis scanning in azimuth through a selected angle, said radar system transmitting pulses of energy and receiving energy from moving targets and from stationary reflectors during the interpulse period over a predetermined range interval comprising:

means responsive to said radar system for developing a video signal having a clutter signal centered at a predetermined frequency and having a varying spectral width, storage means including first and second storage tubes for alternately recording in the first and second tubes the first signal in a range dimension during each interpulse period over a selected number of interpulse periods, extending in an azimuth dimension, reading means coupled to said storage means for reading the first signals in said azimuth dimension stored for said selected number of interpulse periods at each of a plurality of range intervals to develop a range gated second signal having the clutter signal centered at a constant multiple of the predetermined frequency of the clutter signal of said first signal, first means for developing velocity vector signals representative of the velocity of the moving platform, second means for developing antenna scan angle signals, process control means responsive to said first and second means for developing a signal representative of the rate of change of the aircraft velocity along said line-of-sight axis, variable width filter means coupled to said reading means for responding to said second signal and having a variable rejection band width, decoding means coupled between said process control means and said variable width filter means for controlling said rejection band width as a function of the width of said clutter signal, a plurality of narrow band doppler filters operable in common at each range increment read from said storage means, and detecting means coupled to said plurality of doppler filters for detecting the target signals.

* * * * *